(12) United States Patent
Magalhães de Matos

(10) Patent No.: US 10,735,518 B2
(45) Date of Patent: Aug. 4, 2020

(54) SYSTEMS AND METHODS FOR SELF-ORGANIZED FLEETS OF AUTONOMOUS VEHICLES FOR OPTIMAL AND ADAPTIVE TRANSPORT AND OFFLOAD OF MASSIVE AMOUNTS OF DATA

(71) Applicant: Veniam, Inc., Mountain View, CA (US)

(72) Inventor: Ricardo Jorge Magalhães de Matos, Oporto (PT)

(73) Assignee: Veniam, Inc., Mountain View, CA (US)

( * ) Notice: Subject to any disclaimer, the term of this patent is extended or adjusted under 35 U.S.C. 154(b) by 316 days.

(21) Appl. No.: 15/822,303

(22) Filed: Nov. 27, 2017

(65) Prior Publication Data
US 2018/0375939 A1    Dec. 27, 2018

Related U.S. Application Data

(60) Provisional application No. 62/524,655, filed on Jun. 26, 2017.

(51) Int. Cl.
*H04L 29/08* (2006.01)
*G01C 21/34* (2006.01)
(Continued)

(52) U.S. Cl.
CPC .......... *H04L 67/12* (2013.01); *G01C 21/3461* (2013.01); *G01C 21/3697* (2013.01); *G08G 1/161* (2013.01); *G08G 1/20* (2013.01); *G08G 1/22* (2013.01); *H04L 29/08324* (2013.01); *H04L 29/08351* (2013.01); *H04L 29/08945* (2013.01); *H04L 41/12* (2013.01); *H04L 67/1044* (2013.01); *H04L 67/1051* (2013.01); *H04L 67/1072* (2013.01);
(Continued)

(58) Field of Classification Search
CPC ........................ H04L 29/08306–08351; H04L 29/08945–08972; H04L 29/08396; H04L 29/08441; H04L 29/08558; H04L 41/12; H04L 45/02; H04L 67/104–1051; H04L 67/1061; H04L 67/1072; H04L 67/12; H04L 67/32–327; H04W 8/005; H04W 40/026–32; G08G 1/0968–096833; G08G 1/161–164; G08G 1/20; G08G 1/22; G01C 21/34–3415; G01C 21/3453–3691
See application file for complete search history.

(56) References Cited

U.S. PATENT DOCUMENTS

| | | | |
|---|---|---|---|
| 6,720,920 B2 * | 4/2004 | Breed | B60N 2/2863 342/386 |
| 8,155,081 B1 * | 4/2012 | Mater | H04W 48/20 370/331 |

(Continued)

*Primary Examiner* — Brendan Y Higa
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide autonomous vehicle network architectures, systems, and methods for supporting a dynamically configurable network of autonomous vehicles comprising a complex array of both static and moving communication nodes.

20 Claims, 14 Drawing Sheets

(51) Int. Cl.
 *G01C 21/36* (2006.01)
 *G08G 1/00* (2006.01)
 *G08G 1/16* (2006.01)
 *H04L 12/24* (2006.01)
 *H04W 8/00* (2009.01)
 *H04W 40/02* (2009.01)

(52) U.S. Cl.
 CPC ........ *H04L 67/1097* (2013.01); *H04L 67/322* (2013.01); *H04W 8/005* (2013.01); *H04W 40/026* (2013.01)

(56) References Cited

U.S. PATENT DOCUMENTS

| | | | | |
|---|---|---|---|---|
| 8,346,478 | B2* | 1/2013 | Roesser | H04B 7/01 701/454 |
| 8,363,102 | B1* | 1/2013 | Kadoch | H04N 7/18 348/148 |
| 8,571,578 | B1* | 10/2013 | Chen | G01S 5/0009 455/456.1 |
| 9,258,679 | B1* | 2/2016 | Williams | H04W 4/029 |
| 9,609,484 | B1* | 3/2017 | Rodoper | H04W 4/029 |
| 2012/0142366 | A1* | 6/2012 | De Castro Riesco | G01S 5/0252 455/456.1 |
| 2014/0080510 | A1* | 3/2014 | Morgan | G01S 5/02 455/456.1 |
| 2014/0244104 | A1* | 8/2014 | Tan | H04B 1/3822 701/36 |
| 2014/0274069 | A1* | 9/2014 | Scheim | H04W 28/08 455/444 |
| 2015/0088335 | A1* | 3/2015 | Lambert | G08G 1/162 701/1 |
| 2015/0304984 | A1* | 10/2015 | Khemani | H04W 64/003 455/456.1 |
| 2016/0021190 | A1* | 1/2016 | Vuyyuru | H04L 67/18 709/223 |
| 2016/0044129 | A1* | 2/2016 | Bergmann | H04L 67/2847 455/406 |
| 2016/0080378 | A1* | 3/2016 | VanBlon | H04W 64/003 455/410 |
| 2018/0027463 | A1* | 1/2018 | Chen | H04W 36/08 370/331 |
| 2018/0027476 | A1* | 1/2018 | Lei | H04W 76/40 455/419 |
| 2018/0098227 | A1* | 4/2018 | Carnelli | H04W 64/003 |
| 2018/0279066 | A1* | 9/2018 | Dollinger | H04W 8/18 |
| 2019/0090174 | A1 | 3/2019 | Rocci et al. | |
| 2019/0364492 | A1* | 11/2019 | Azizi | H04W 68/005 |

* cited by examiner

SYSTEMS AND METHODS FOR SELF-ORGANIZED FLEETS OF AUTONOMOUS VEHICLES FOR OPTIMAL AND ADAPTIVE TRANSPORT AND OFFLOAD OF MASSIVE AMOUNTS OF DATA

CROSS-REFERENCE TO RELATED APPLICATIONS/INCORPORATION BY REFERENCE

This patent application makes reference to, claims priority to, and claims benefit from U.S. Provisional Patent Application Ser. No. 62/524,655, filed on Jun. 26, 2017, and titled "SYSTEMS AND METHODS FOR SELF-ORGANIZED FLEETS OF AUTONOMOUS VEHICLES FOR OPTIMAL AND ADAPTIVE TRANSPORT AND OFFLOAD OF MASSIVE AMOUNTS OF DATA," which is hereby incorporated herein by reference in its entirety.

The present application is related to: U.S. patent application Ser. No. 15/133,756, filed Apr. 20, 2016, and titled "Communication Network of Moving Things;" U.S. patent application Ser. No. 15/132,867, filed Apr. 19, 2016, and titled "Integrated Communication Network for a Network of Moving things;" U.S. patent application Ser. No. 15/138,370, filed on Apr. 26, 2016, and titled, "Systems and Methods for Remote Configuration Update and Distribution in a Network of Moving Things;" U.S. patent application Ser. No. 15/157,887, filed on May 18, 2016, and titled "Systems and Methods for Remote Software Update and Distribution in a Network of Moving Things;" U.S. patent application Ser. No. 15/228,613, filed Aug. 4, 2016, and titled "Systems and Methods for Environmental Management in a Network of Moving Things;" U.S. patent application Ser. No. 15/213,269, filed Jul. 18, 2016, and titled "Systems and Methods for Collecting Sensor Data in a Network of Moving Things;" U.S. patent application Ser. No. 15/215,905, filed on Aug. 4, 2016, and titled "Systems and Methods for Environmental Management in a Network of Moving Things;" U.S. patent application Ser. No. 15/245,1242, filed Aug. 24, 2016, and titled "Systems and Methods for Shipping Management in a Network of Moving Things;" U.S. patent application Ser. No. 15/337,856, filed Oct. 28, 2016, and titled "Systems and Methods for Optimizing Data Gathering in a Network of Moving Things;" U.S. patent application Ser. No. 15/351,811, filed Nov. 15, 2016, and titled "Systems and Methods to Extrapolate High-Value Data from a Network of Moving Things;" U.S. patent application Ser. No. 15/353,966, filed Nov. 17, 2016, and titled "Systems and Methods for Delay Tolerant Networking in a Network of Moving Things, for Example Including a Network of Autonomous Vehicles;" U.S. patent application Ser. No. 15/414,1228, filed on Jan. 25, 2017, and titled "Systems and Methods for Managing Digital Advertising Campaigns in a Network of Moving Things;" U.S. patent application Ser. No. 15/451,696, filed Mar. 7, 2017, and titled "Systems and Methods for Managing Mobility in a Network of Moving Things;" U.S. patent application Ser. No. 15/428,085, filed on Feb. 8, 2017, and titled "Systems and Methods for Managing Vehicle OBD Data in a Network of Moving Things, for Example Including Autonomous Vehicle Data;" U.S. Provisional Patent Application Ser. No. 62/336,891, filed May 16, 2016, and titled "Systems and Methods for Vehicular Positioning Based on Message Round-Trip Times in a Network of Moving Things;" U.S. Provisional Patent Application Ser. No. 62/350,814, filed Jun. 16, 2016, and titled "System and Methods for Managing Contains in a Network of Moving Things;" U.S. Provisional Patent Application Ser. No. 62/360,592, filed Jul. 11, 2016, and titled "Systems and Methods for Vehicular Positioning Based on Wireless Fingerprinting Data in a Network of Moving Things;" U.S. Provisional Patent Application Ser. No. 62/376,937, filed on Aug. 19, 2016, and titled "Systems and Methods to Improve Multimedia Content Distribution in a Network of Moving things;" U.S. Provisional Patent Application Ser. No. 62/376,955, filed Aug. 19, 2016, and titled "Systems and Methods for Reliable Software Update in a Network of Moving Things;" U.S. Provisional Patent Application Ser. No. 62/377,350, filed Aug. 19, 2016, and titled "Systems and Methods for Flexible Software Update in a Network of Moving Things;" U.S. Provisional Patent Application Ser. No. 62/378,269, filed Aug. 23, 2016, and titled "Systems and Methods for Flexible Software Update in a Network of Moving Things;" U.S. Provisional Patent Application Ser. No. 62/415,196, filed Oct. 31, 2016, and titled "Systems and Method for Achieving Action Consensus Among a Set of Nodes in a Network of Moving Things;" U.S. Provisional Patent Application Ser. No. 62/415,268, filed Oct. 31, 2016, and titled "Systems and Methods to Deploy and Control a Node in a Network of Moving Things;". S. Provisional Patent Application Ser. No. 62/417,705, filed Nov. 4, 2016, and titled "Systems and Methods for the User-Centric Calculation of the Service Quality of a Transportation Fleet in a Network of Moving Things;" U.S. Provisional Patent Application Ser. No. 62/429,410, filed on Dec. 2, 2016, and titled "Systems and Methods for Improving Content Distribution for Fleets of Vehicles, Including for Example Autonomous Vehicles, By Using Smart Supply Stations;" and U.S. Provisional Patent Application Ser. No. 62,449,394, filed Jan. 23, 2017, and titled "Systems and Methods for Utilizing Mobile Access Points as Fixed Access Points in a Network of Moving Things, for Example Including Autonomous Vehicles;" the entire contents of each of which is hereby incorporated herein by reference.

BACKGROUND

Current communication networks are unable to adequately support communication environments involving mobile and static nodes. As a non-limiting example, current communication networks are unable to adequately support communication among and with autonomous vehicles of a network of autonomous vehicles. Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
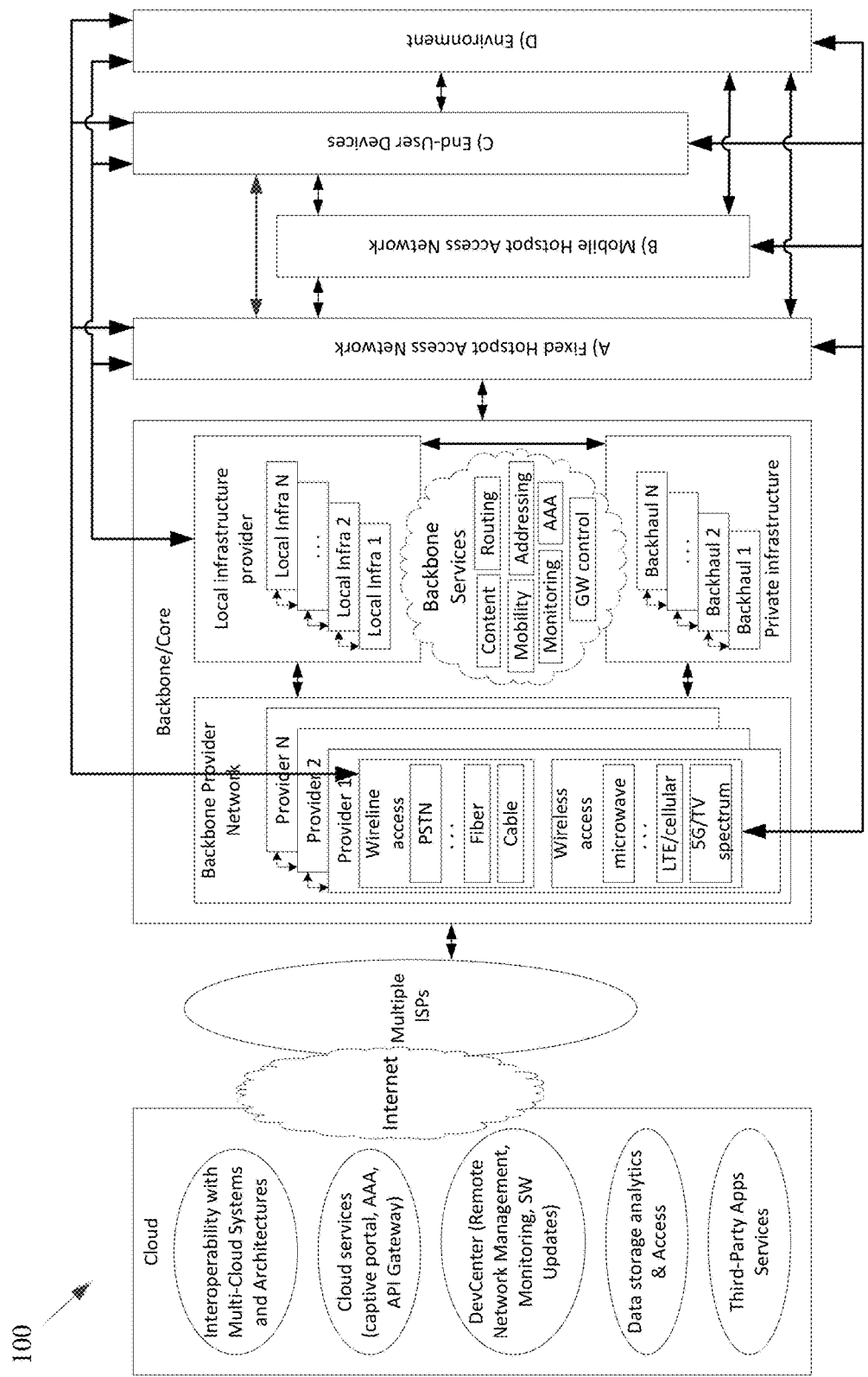
FIG. 1 shows a block diagram of a communication network, in accordance with various aspects of this disclosure.

Various aspects of this disclosure provide systems and methods for supporting a network of autonomous vehicles. As a non-limiting example, various aspects of this disclosure provide systems and methods for supporting a dynamically configurable network of autonomous vehicles comprising a complex array of both static and moving communication nodes (e.g., the Internet of moving things, autonomous vehicle networks, etc.). For example, a network of autonomous vehicles implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

In accordance with various aspects of the present disclosure, an affordable multi-network Mobile Access Point (or Mobile AP or MAP) is presented. Note that the Mobile AP may also be referred to herein as an on-board unit (OBU), etc. The Mobile AP may, for example, comprise a plurality of networking interfaces (e.g., Wi-Fi, 802.11p, 4G, Bluetooth, UWB, etc.). The Mobile AP may, for example, be readily installed in or on private and/or public vehicles (e.g., individual user vehicles, vehicles of private fleets, vehicles of public fleets, autonomous vehicles, etc.). The Mobile AP may, for example, be installed in transportation fleets, waste management fleets, law enforcement fleets, emergency services, road maintenance fleets, taxi fleets, aircraft fleets, etc. The Mobile AP may, for example, be installed in or on a vehicle or other structure with free mobility or relatively limited mobility. The Mobile AP may also, for example, be carried by a person or service animal, mounted to a bicycle, mounted to a moving machine in general, mounted to a container, etc.

The Mobile APs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the Mobile APs and also Fixed Access Points (or Fixed APs or FAPs) connected to the wired or tethered infrastructure (e.g., a local infrastructure, etc.). Note that Fixed APs may also be referred to herein as Road Side Units (RSUs).

In an example implementation, the Mobile APs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the Mobile APs using one or more relatively short-range protocols (e.g., Wi-Fi, Bluetooth, UWB, etc.). The Mobile APs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer Mobile APs are necessary to provide blanket coverage over a geographical area.

The Mobile AP may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the Mobile AP may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the Mobile AP may operate to provide in-vehicle Wi-Fi Internet access to users in and/or around the vehicle (e.g., a bus, train car, taxi cab, public works vehicle, etc.). The Mobile AP may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the Mobile AP may utilize the cellular network interface to provide connectivity in geographical areas that are not presently supported by a Fixed AP, may utilize the cellular network interface to provide a fail-over communication link, may utilize the cellular network interface for emergency communications, may utilize the cellular network interface to subscribe to local infrastructure access, etc. The Mobile AP may also utilize the cellular network interface to allow the deployment of solutions that are dependent on the cellular network operators.

A Mobile AP, in accordance with various aspects of the present disclosure, may for example comprise a smart connection manager that can select the best available wireless link(s) (e.g., Wi-Fi, 802.11p, cellular, vehicle mesh, etc.) with which to access the Internet. The Mobile AP may also, for example, provide geo-location capabilities (e.g., GPS, etc.), motion detection sensors to determine if the vehicle is in motion, and a power control subsystem (e.g., to ensure that the Mobile AP does not deplete the vehicle battery, etc.). The Mobile AP may, for example, comprise any or all of the sensors (e.g., environmental sensors, etc.) discussed herein.

The Mobile AP may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of a Mobile AP (or a distributed system thereof), etc.

For example, an example implementation may operate to turn each vehicle (e.g., both public and private taxis, buses, trucks, autonomous vehicles, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

In an example scenario in which public buses are moving along city routes and/or taxis are performing their private transportation services, the Mobile AP is able to collect large quantities of real-time data from the positioning systems (e.g., GPS, etc.), from accelerometer modules, etc. The Mobile AP may then, for example, communicate such data (e.g., raw data, processed data, etc.) to the Cloud, where the data may be processed, reported and viewed, for example to support such public or private bus and/or taxi operations, for example supporting efficient remote monitoring and scheduling of buses and taxis, respectively.

A Mobile AP may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or Mobile AP or OBU thereof) can collect sensor data from the sensor device and upload the collected data to a database in the Cloud. The appropriate action can then be taken. In an example waste management implementation, several waste management (or collection) trucks may be equipped with Mobile APs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

For example, in an example port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-Cloud systems and architectures. Another example component (e.g., a Cloud service component) may, for example, provide various Cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems or notes of the network 100. The Backbone/Core Infrastructure may, for example, comprise the ability to utilize and/or interface with different data storage/processing systems (e.g., MongoDB, MySql, Redis, etc.).

Figure 2:
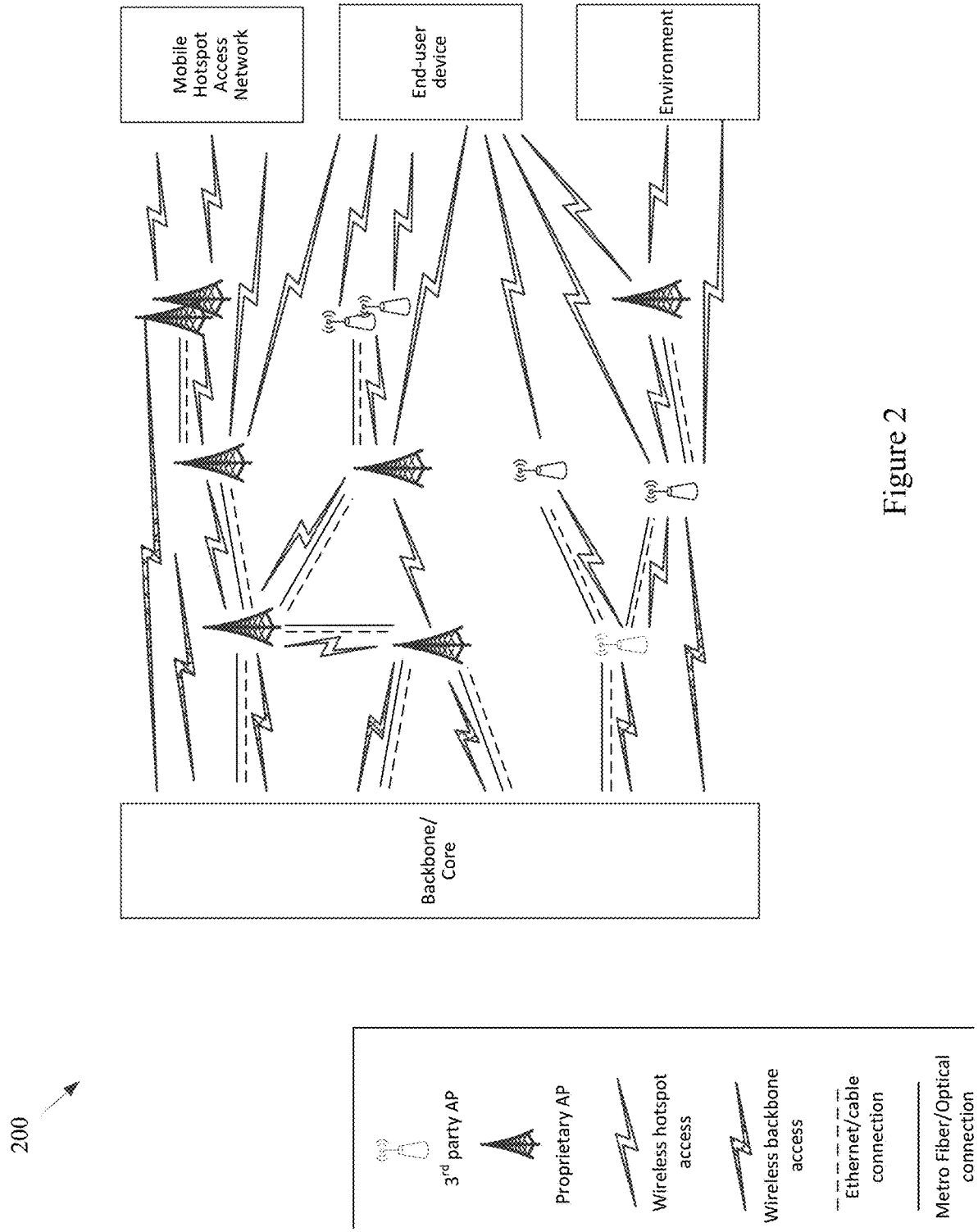
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down.

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., MAP-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.). Note that a plurality of Fixed APs may be utilized for fault-tolerance/fail-recovery purposes.

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
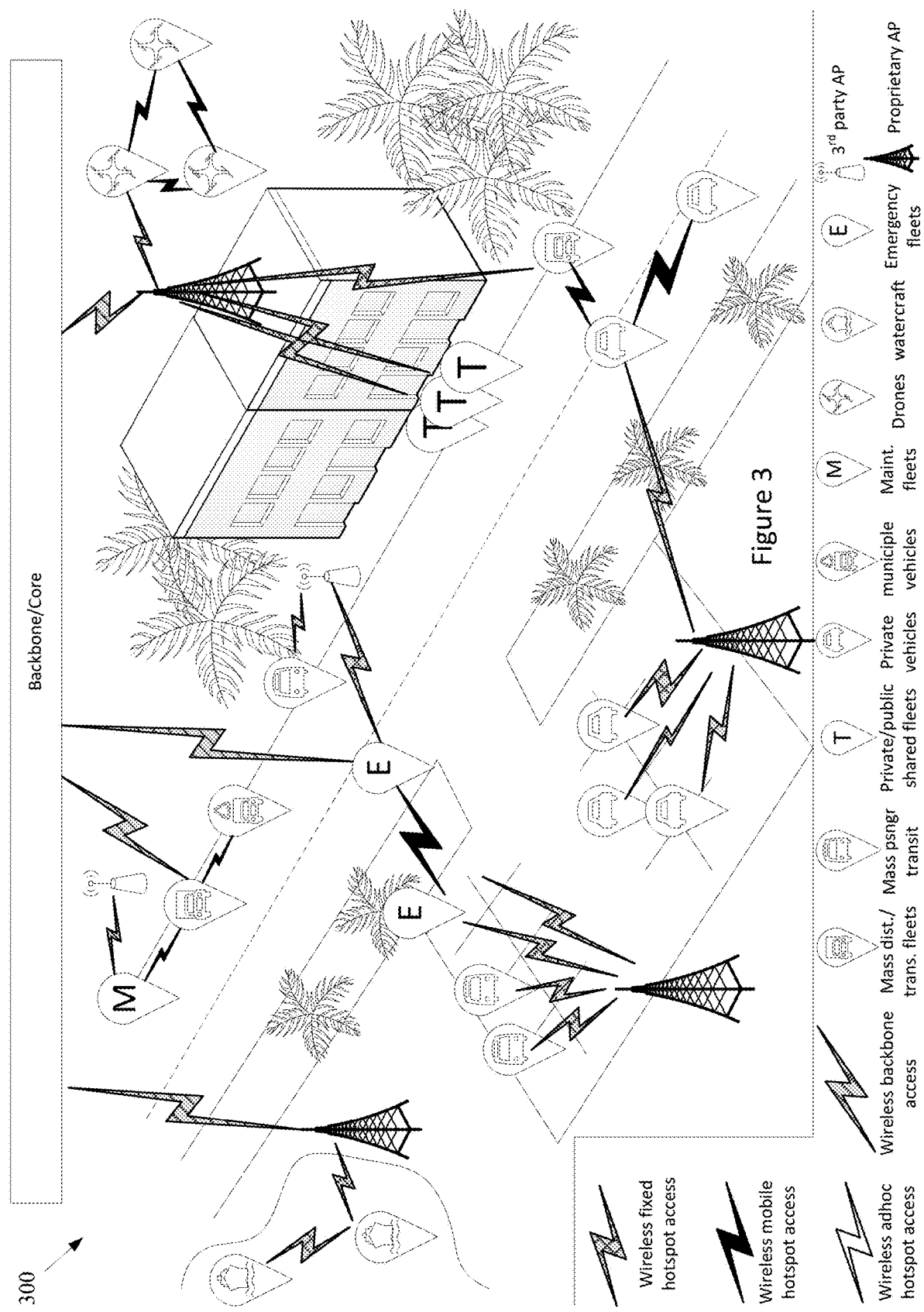
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU thereof) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Devices, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
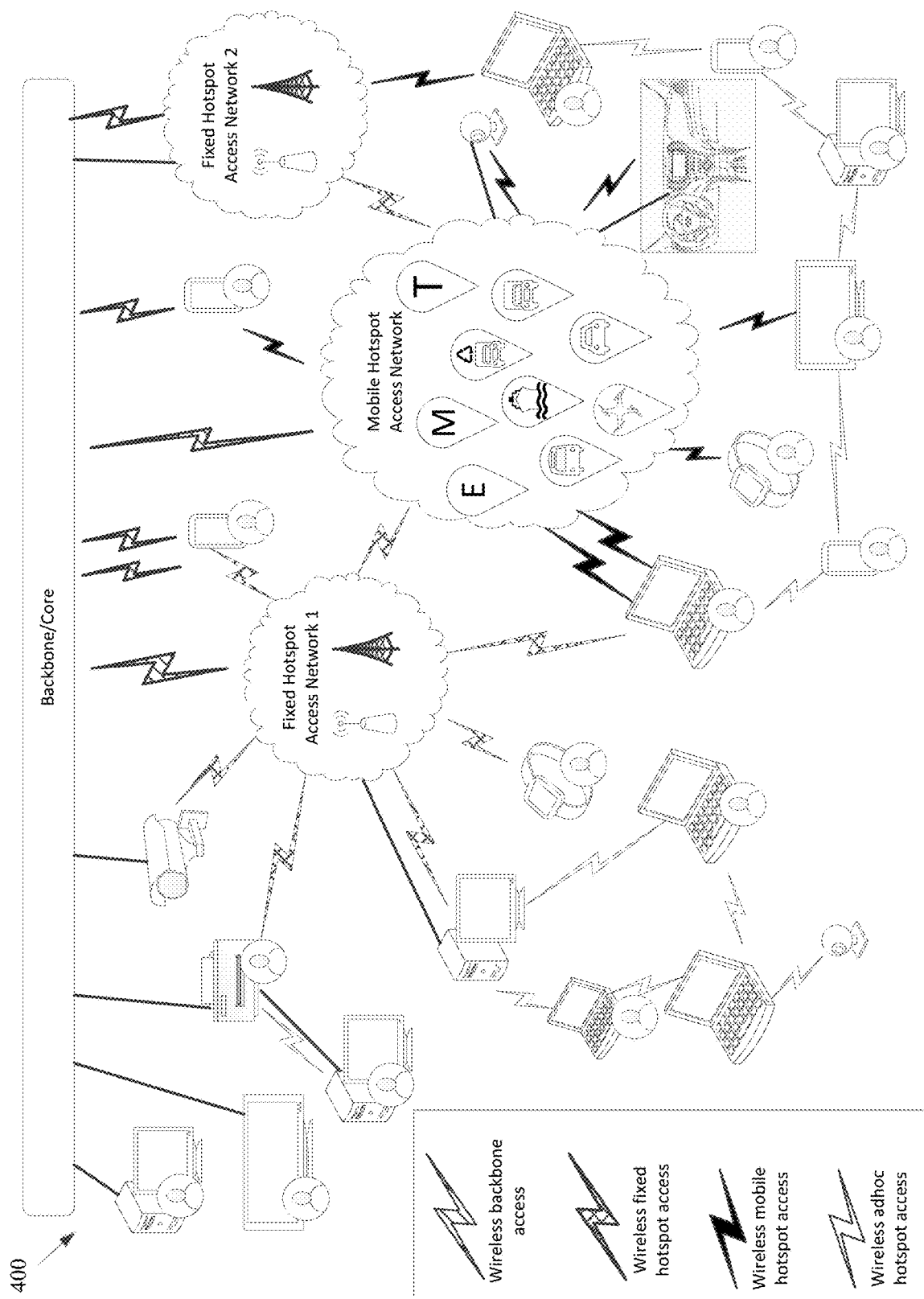
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

People have always communicated with one another, beginning with physical and oral communication, and progressing to forms of written communication conveyed using physical and wired or wireless electronic means. As human desires for mobility have grown, various vehicles have been developed, and electronic forms of communication have allowed individuals to maintain contact with one another while traveling using those vehicles. Support for various electronic forms of communication has become an integral part of the vehicles in use, to enable vehicle operation and communication by vehicle occupants. The various electronic forms of communication are now integrated into the infrastructure of our vehicles, and the advantages of electronically interconnecting systems and occupants of neighboring vehicles using forms of wireless communication are increasingly being realized, enabling safety and comfort improvements for their users.

The Connected Vehicle (CV) concept leverages the ability of vehicles to electronically communicate with one another, and with networks such as the Internet. CV technologies enable vehicle systems to provide useful context-aware information to a vehicle and to the vehicle operator (e.g., driver) or occupants, allowing the operator to make more informed, safer, energy-efficient, and better decisions. CV technologies also enable the vehicles to communicate terabytes of data between the physical world and Cloud-based systems. Such data may then feed the operational flows of, for example, transportation agencies, municipalities, and/or vehicle fleet owners, allowing such entities to enhance the knowledge they have about the environment and conditions in which their vehicles operate, and to benefit from having historical data and actionable insights to better plan, allocate, and manage their operations and logistics, making them smarter, safer, cost-effective, and productive.

However, a CV cannot make any choices for the operator, and cannot navigate and control the vehicle independently. Such actions are only possible in vehicles referred to herein as Autonomous Vehicles (AVs), which are computer-navigated vehicles that include autonomous functionalities including, by way of example and not limitation, the ability to self-park the vehicle, the ability to control and navigate the vehicle (e.g., start, stop, steer, etc.), and automatic collision avoidance features. At first glance, AVs do not need CV technologies to operate, since such vehicles are able to independently navigate the road network. Nevertheless, CV technologies enable the communication of real-time information about, for example, vehicle traffic, environmental conditions, unexpected events, and all kinds of context information that characterizes the roads on which the AVs are travelling. With such information, AVs are equipped to make optimized decisions in-advance of encountering situations such as, for example, congested travel routes, accidents or other obstacles along the road, etc. Also, CV technologies enable AVs to maintain updated software/firmware and any data sets relied upon by the AV (e.g., road maps).

The self-driving capability of AVs may facilitate and foster the use of shared vehicles, enabling rental services of public vehicles (e.g., fleets of taxis or buses) to substitute for personal vehicle ownership. Shared AVs may work better in dense urban areas, but there may also be residential/household AVs serving multiple clients in the same geographic region. The full-potential of the shared AV concept may, for example, result from combining the power of allowing the same vehicle to be used by multiple individuals (referred to herein as "vehicle sharing") that may result in reduced parking costs, and from optimizing each vehicle trip to serve the purposes of multiple passengers (referred to herein as "ride sharing") that may reduce road congestion. The use of shared AVs may increase the capacity utilization rate of vehicles and may result in additional vehicle travel, which may include vehicle travel involved in the return to the origin of a trip, particularly in situations involving low-density suburban and rural areas.

Despite all the aforementioned benefits, the use of shared AVs without personal ownership is likely to involve more frequent cleaning and repairs, and may have more sophisticated construction and electronic surveillance requirements to minimize vandalism risks. These aspects may reduce the comfort and privacy of passengers. Moreover, many private individuals that drive very frequently may continue to prefer to have their own vehicles, in order to show their own personal style, guide tourists, assist passengers to safely reach their destinations, carry their own luggage, etc.

In a future of autonomous and shared vehicles, the potential for much higher vehicle utilization may be seen as an opportunity for electric vehicles (EVs) to take the market by storm, which will increase the use of renewable and clean energy sources and reduce air pollution and $CO_2$ emissions. Massive market penetration of EVs may be made possible with the deployment of a scalable and connected infrastructure to, for example, enable the monitoring of charging status of EV batteries, allow vehicle manufacturers to remotely monitor the deployment of new battery technologies, support automated reservation and billing at charging stations, and permit remote control of charging schedules. Based on those connectivity and technological needs, and looking to the demands of AVs, one may conclude that a connected vehicle infrastructure that enables the shared AV concept is the strongest and ideal candidate to also empower the EV concept.

When one considers that the fleets of public vehicles we have today may operate as Fleets of Autonomous Vehicles that are Electric and Shared (FAVES), we may then consider the potential impact such FAVES may have on, for example, the planning, design, and user behavior of cities and roads; user urban travel and mobility; the transformation of people's lives; employment; and automotive industry planning and production.

The concept of FAVES, in accordance with the various aspects disclosed herein, offer a number of benefits. Such benefits include, for example, smart transportation that coordinates operations and rides to reduce the number of vehicles and avoid congestion on the roads and competition for parking spaces, providing for high-quality and highly efficient transportation and improved user mobility. The use of FAVES according to the present disclosure enables improvements in city infrastructure planning, since cities may change the way the city provides access, enabling the re-design, elimination, and/or reduction in the capacity of garages, parking lots, and roads. The use of FAVES as described herein allows an improved urban quality of life, where cities may be differentiated in terms of the mobility services they support, making the urban living more attractive. Such FAVES provide increased mobility and may provide access to mobility services in empty backhauls, and in rural, less-developed areas. The use of such FAVES allows users to experience enjoyable and convenient travel, where vehicle occupants are able to rest and/or work while traveling, increasing their productivity and reducing their stress levels, and where non-drivers have more convenient and affordable travel options that avoid the costs associated with travel that involves paid drivers (e.g., conventional taxis and buses). FAVES as described herein provide for safer travel, because such FAVES may decrease common vehicular travel risks, thereby avoiding the costs of vehicle accidents and reducing insurance premiums. In addition, the availability of FAVES enables individuals to realize personal vehicle maintenance savings through the use of vehicle rental services as a substitute for personal vehicle ownership, which can eliminate maintenance of personal vehicles and can result in various end-user savings. The use of FAVES in accordance with the present disclosure may cause a shift in vehicle manufacture, as manufacturers move their focus from the building of traditional vehicles to the activities of selling travel time well spent, by making modular, upgradable, and re-usable vehicles.

The increased deployment of AVs (e.g., and likewise, FAVES) may come with a number of potential costs and/or risks, which are addressed by various aspects of the present disclosure. For example, the use of AVs may result in a reduction in employment of those individuals trained for the operation, production, and maintenance of traditional vehicles. The adoption of AVs may lead to a reduction in the need for drivers, as well as the demand for those individuals skilled in vehicle repair, which may be due to a reduction in vehicle accidents enabled by aspects described herein. Such reductions in work force may enable the displaced workers to move to the types of work where they are needed including, for example, the design and manufacturer of AVs. The use of AVs may also come with additional risks such as, for example, system failures, may be less safe under certain conditions, and may encourage road users to take additional risks. Systems in accordance with various aspects of the present disclosure address the handling of such system failures and amelioration of the potential risks. Aspects of the present disclosure help the operator of AVs (e.g., and FAVES as well) to avoid some of the costs of additional equipment (e.g., sensors, computers and controls), services, and maintenance, and possibly roadway infrastructure, that may be involved in meeting the manufacturing, installation, repair, testing, and maintenance standards for AVs, by minimizing the risks of system failures that could be fatal to both vehicle occupants and other users of the roads on which the AVs travel. Some aspects of systems according to the present disclosure also address security/privacy risks such as, for example, the possible use of AVs for criminal/terrorist activities (e.g., bomb delivery) and the vulnerability of such systems to information abuse (e.g., GPS tracking/data sharing may raise privacy concerns).

Although the traditional vehicle concept is well and widely understood by most of society, the special requirements and capabilities of autonomous vehicles, especially those autonomous vehicles that are electric and shared (i.e., the FAVES concept), will change the automotive industry.

In accordance with aspects of the present disclosure, vehicles that are autonomous, shared, and electrically powered are not simply a means to carry people or goods from point A to point B, but rather become a powerful element able to perform different context-aware and mobility actions, fueled by the interaction with the overall automotive ecosystem. This new paradigm allows a FAVES, as described herein, to play an important role in the quality of life in urban areas, offering benefits to the traveler, the environment, transit providers, manufacturers, and other entities.

A system in accordance with various aspects of the present disclosure manages the collaborative actions and decisions taken by the vehicles of a FAVES. Such a system supports operation of a FAVES using a Mobility-as-a-Service (MaaS) paradigm, offering mobility solutions to both travelers and goods, based on travel needs. The system supporting the application of the MaaS paradigm to the management of a FAVES may take into consideration various factors including, for example, the value of passenger time, ridership habits, road occupancy, infrastructure status, social/environmental consequences of travel, and parking opportunities, to name just a few of those factors. A system in accordance with the present disclosure helps end-users to avoid traditional issues related to vehicle depreciation, financing costs, insurance, vehicle maintenance, taxes, etc., that are part of conventional vehicle ownership and usage.

A system in accordance with aspects of the present disclosure improves upon components used to support a successful MaaS strategy of the mobility market of the future. Such a system may support a set of challenging services and strategies used when operating a FAVES according to a MaaS paradigm, and works to, for example, reduce city congestion, reduce vehicle emissions, decrease costs to the end-user, improve utilization of transit providers, and enable the collaboration of different fleets of vehicles. Below, we provide additional details on the operation and control of a system supporting to encourage deployment of AVs (e.g., a FAVES) under a MaaS paradigm.

A system in accordance with aspects of the present disclosure may support combining transportation services from different public and private transportation providers, whether applied for movement of people and/or goods. Such a system may provide support for new mobility and on-demand service providers focused on ride-sharing, car-sharing, and/or bike-sharing.

A system according to various aspects of the present disclosure may support methods of managing (e.g., deployment/maximization) the capacity of roads such as, for example, managing deployment of autonomous vehicles in what may be referred to herein as "platooning," the use of narrower roadway lanes, reducing vehicle stops at intersections, and the use of improved road striping and road signage that aid recognition of the roadway by autonomous vehicles, thus decreasing road congestion/costs while increasing the efficiency and utilization of transit providers that contribute to the overall transit network in a region.

A system according to the present disclosure may support the creation and management of AV trips, which may, for example, be done through multiple modes. The system may provide for converging bookings and payments that may be managed collectively, under the same system platform, in which end-users may pay using a single account. In accordance with aspects of the present disclosure, the system may support different subscription methods such as, for example, "pay-per-trip," and the use of a monthly fee that provides for a certain travel distance and/or a fee structure that supports unlimited travel by end-users. The system may provide for system and end-user tracking of AV usage, and that includes functionality that provides for the handling of various end-user incentives and/or tax exemptions based on the reductions of overall emissions resulting from the use of AVs for end-user travel. A system in accordance with various aspects of the present disclosure may provide operator tools that permit the definition of various parameters relating to parking facilities such as, by way of example and not limitation, system parameters concerning the cost of parking and/or public transit demands, which may be used by the system in determining actions (e.g., parking, charging, traveling) that AVs should take when waiting without passengers. A system according to the present disclosure may include functionality that encourages and supports the furtherance of AV deployment such as, for example, tools and reporting functionality that support vehicle and system certification policies, licensing rules, and autonomous vehicle following distance requirements.

A FAVES in a network providing MaaS will transform the opportunities that are available to those wishing to travel, by enabling people to have door-to-door transfer via self-navigating vehicles to preferred destinations, at a speed of travel normally available using private vehicle travel, and at a cost-per-mile comparable to that of a subway ticket, or at a significantly lower cost than current taxi and ridesharing prices.

Operating a FAVES to provide MaaS involves use of a system that supports a service-driven and market-oriented stack that embodies the know-how, market needs, and requirements of different actors including, for example, end-users; institutions; vehicle and infrastructure equipment manufacturers; legal, regulatory, government, and safety organizations; and/or other agencies. A system in accordance with the present disclosure enables those actors to join forces and act together to build and manage a scalable, high-performance, robust, and safe ecosystem in which AVs are the central point to provide high-value services able to optimize network capacity, reduce congestion on roads, make a passenger's journey stress free, positively impact community and socio-economic growth, increase safety, and improve fleet operations. Additional details of the functionality of a system supporting the use of a FAVES in providing MaaS are discussed below.

A system in accordance with aspects of the present disclosure may support functionality for management of the infrastructure with which AVs will operate or interact such as, for example, roads, parking places/spaces, cities, etc., and may be designed, developed, and optimized to cope with the specific requirements of AVs. There is a strong public, business, and government interest in, for example, reducing congestion and pollution along roads and highways, and in decreasing the time spent entering and leaving parking facilities. A system in accordance with aspects of the present disclosure may support the design and implementation of such infrastructure elements from the beginning, including providing support for the inclusion of the latest innovations in roadway striping, signage, and traffic control lights/signs, thus providing support for the best physical substrate to support AV operation.

To enable the management of installation and maintenance of infrastructure elements that support AV operation, systems in accordance with the present disclosure support system interfaces for interactions involving municipal authorities, transit and transportation providers, and/or governmental and legal agencies, that can explore and implement policies, managed via system parameters, that will further AV deployment, such as certification policies, licensing rules, and following distance standards.

A system in accordance with aspects of the present disclosure may provide support for private sector companies such as, for example, Tesla, Google, Uber, etc. that may control the deployment of AVs and many of the technologies that those AVs use. Those companies are building many of the AVs now being explored. A system supporting a FAVES as described herein will enable such private sector companies to respond to market forces including, for example, being involved in the deployment and management of AV software for FAVES. Such software may include, for example, functionality related to automated controls (e.g., steering, braking, signals, etc.), self-parking, auto-collision avoidance features, self-vehicle control, etc. Such a system may provide support for in-vehicle services that leverage on AV functionalities.

A system in accordance with aspects of the present disclosure may provide support for traditional vehicle OEMs, as they transition to support the MaaS paradigm. Such traditional vehicle OEMs may continue to find ways to sell vehicles to end-users, but may also turn the concept of "building traditional vehicles to sell directly to the end-user" into selling vehicles to service providers, or vehicles as a service, focusing on, for example, "Miles" or "Amount of time well spent" rather than on "Number of vehicles sold." A system in accordance with aspects of the present invention may provide support for the transition of such OEMs from traditional vehicle sale to end-users, providing support for management, maintenance, rotation, and usage tracking of AVs of a FAVES, as the AVs pass from the OEMs, to the service providers, and into full service with end-users.

It is expected that traditional vehicle OEMs may begin a move into the AV market by deploying modular, upgradable, and re-usable AV hardware to enable the provision of services on top of them. Things such as, for example, display screens used to provide infotainment services for the occupants; diverse types of and/or redundant sensors (e.g., optical, infrared, radar, ultrasonic, and laser) capable of operating in a variety of conditions (e.g., rain, snow, unpaved roads, tunnels, etc.); high-functionality, in-vehicle cameras and computers, as well as sophisticated vehicle and occupant monitoring and electronic surveillance systems, to minimize the effects of system failures and risks due to vandalism, while increasing system physical and data security. A system according to various aspects of the present disclosure provides support for deployment/installation, tracking, maintenance, and upgrade of such AV hardware.

The operation of most AV services and functionalities will involve communication and/or operation with an environment that surrounds each AV, and with the Internet. Thus, the software and hardware functionality of the AV and the operation of a system in accordance with the present disclosure may depend heavily on leveraging secure, high-bandwidth, low-latency, reliable communication technologies and protocols, as well as data management services able to optimize AV operations. An example of a suitable network capable of supporting AVs of a FAVES according to the present disclosure may be found, for example, in U.S. patent application Ser. No. 15/133,756, filed Apr. 20, 2016, and titled "Communication Network of Moving Things; U.S. patent application Ser. No. 15/132,867, filed Apr. 19, 2016, and titled "Integrated Communication Network for a Network of Moving things;" and U.S. patent application Ser. No. 15/451,696, filed Mar. 7, 2017, and titled "Systems and Methods for Managing Mobility in a Network of Moving Things; the entirety of each of which is hereby incorporated herein by reference".

In this manner, AVs of a FAVES may be equipped with the connectivity solutions to enable them to perform functions such as, for example, the actions of inter-AV coordination and functionality that enables AVs of a FAVES to reach a consensus among multiple vehicles using vehicle-to-vehicle (V2V) communications; the acquisition, sharing, and offloading of data, events, and other digital content locally and/or via the Internet; the use of long-range communication systems (e.g., cellular) to gain access to road and highway maps, AV system software upgrades, road condition reports, and emergency messages; and the establishment of connectivity fallback in case of any emergency, etc.

On top of the networking infrastructure that connects AVs, described herein, there are services that a system according to the present disclosure may provide to help ensure the most suitable functionality, behavior, and monitoring of the AV network takes place. A system in accordance with the present disclosure may, for example, provide functionality that supports AV maintenance; electronic map updates; vehicle insurance-related tracking of AV movement and events that occur during operation of the AV; operator and end-user interfaces; and management of one or more FAVES that are independent, coordinated, and/or cooperative.

The services supported by a system according to aspects of the present disclosure may be targeted for different types of markets, and may include, for example, the testing, maintenance and repair of AV components such as sensors and controls; services related to ultra-precise navigation tools including, for example, those related to one or more Global Navigation Satellite Systems (GNS) (e.g., Global Positioning System (GPS)) and 2D/3D map information; and services related to the management, storage, and securitization of video feeds that can be important for insurance purposes. Additional services supported by a system according to the present disclosure may include, for example, application programming interfaces (APIs) that enable access to data, events, and other digital contents having possible impact on the operations and logistics of fleets, as well as on advertising campaigns of different agencies and retailers; and APIs to remotely manage and control the operations and software of AVs, which may be important for fleet managers.

A system according to aspects of the present disclosure may provide support for management of various aspects of human factors involved in the interaction of AVs with end-users or consumers, as well as the impact of those factors on the requirements of services that leverage on the AV ecosystem, which may be a part of any AV deployment. Those services may, for example, be related to environmental or refuse management in cities, the management of Wi-Fi offload for end-users/consumers, road pricing and fees for vehicular travel within cities or states, and/or APIs for system developers.

A system in accordance with aspects of the present disclosure may take into consideration the influence of human behaviors on the delivery of services. The system may be configured to take into account the use-cases, scenarios, and socio-economic impact resulting from the interaction of AVs and the system described herein with people and communities, as well as vulnerable users. In this way, the system according to aspects of the present disclosure may be arranged so that the overall ecosystem provided and orchestrated around AVs may be tailored to meet the needs/desires of different end-users and operators.

A system in accordance with various aspects of the present disclosure may provide support for a set of "technology pillars" that may be used operate and manage one or more AVs in a way that enables the AVs to deliver valuable products or services for multiple markets. An example set of such "technology pillars" are related to, for example, "connected" technologies (e.g., wireless communication network technologies for a network of moving things); the inclusion of advanced and sophisticated hardware/software systems that increase the security and safety of both AV occupants and other users of the roads/highways; and functionality that is configured to handle the huge volumes of data that come with the operation of large numbers of AVs, consistent with enabling existing operating models and services of Intelligent Transport System (ITS) companies to fully benefit from such data. The example set of "technology pillars" supported by a system according to aspects of the present disclosure may also include functionality that enables groups of AVs to autonomously make collaborative decisions among the AVs of the group; and functionality that supports using the MaaS concept to operate and manage AVs in an integrated way. Additional details about the above-listed "technology pillars" that may be supported by a system as described herein, are provided below.

Wireless digital connectivity may be a part of many AV use-cases and scenarios, and may be of significant importance to AV passengers for use in accessing the Internet, to AV manufacturers for performing remote diagnosis and over-the-air software/firmware/configuration/data (e.g., map) updates, to advertising agencies and retailers for use in updating AV media content, to AV software companies and developers to test new functionality of AVs, and to service providers for acquisition of data related to their services. Various example systems and methods that provide media information (e.g., multi-media, music, advertising, etc.) may be found in U.S. Provisional Patent Application Ser. No. 62/376,937, filed on Aug. 19, 2016, and titled "Systems and Methods to Improve Multimedia Content Distribution in a Network of Moving things;" U.S. patent application Ser. No. 15/414,1228, filed on Jan. 25, 2017, and titled "Systems and Methods for Managing Digital Advertising Campaigns in a Network of Moving Things;" and U.S. Provisional Patent Application Ser. No. 62/429,410, filed on Dec. 2, 2016, and titled "Systems and Methods for Improving Content Distribution for Fleets of Vehicles, Including for Example Autonomous Vehicles, By Using Smart Supply Stations;" the entire contents of each of which are hereby incorporated herein by reference.

Due to the different connectivity needs of the various use-cases and scenarios in which AVs will operate, a system in accordance with various aspects of the present disclosure may provide smart and intelligent connectivity tools, to help operators and end-users make sure that the type, scope, and capacity of the wireless connectivity made available to each AV is tailored to the context and requirements of each individual scenario, while optimizing the functionality of the AV and the services provided by the AV, as a whole.

A system in accordance with the present disclosure may provide support for the configuration and management of, for example, heterogeneous and high-capacity connectivity over different networks; context-aware access to connectivity and mobility; the aggregation of bandwidth through different technologies; a gateway for Internet access, connectivity fallback, and networking offload; the evolution of V2V, V2I, and V2X communication architecture and equipment; and smart management of radio frequency (RF) spectrum occupancy.

A system in accordance with the present disclosure may provide support for deployment of AVs on a large scale and at a fleet level, and will include functionality that AVs may need to securely communicate and cooperate with one another to reach agreement regarding local actions to be performed by AVs on a road or highway. AVs may often need to make decisions carrying significant risk that are coordinated with other AVs, without the need to communicate with centrally located systems and networking points that may impose additional and unacceptable delays and overhead upon such decisions. A system in accordance with aspects of the present disclosure enables an AV to quickly initiate secure and trusted vehicle-to-vehicle (V2V), vehicle-to-infrastructure (V2I), and/or vehicle to anything (V2X) communications with neighbor AV and infrastructure elements. Such a system may, for example, provide for deployment of context-aware protocols or "security-as-a-service" packages based on the level of security required for any AV application and/or service; and ensure that security logs of AVs are stored and communicated to the system or other elements in a delay tolerant fashion for backup, backtracking, and fault detection. The system may, for example, provide support and configuration systems that enable quick and trusted consensus among AVs; that enable secure interoperability between AVs from different fleets; and that provide and distribute Authentication, Authorization, and Accounting (AAA) functions.

A system in accordance with various aspects of the present disclosure will provide support for the functionality of AVs referred to herein as Advanced Driving Assistance Systems (ADAS), which the independent and self-driving capabilities of AVs including, for example, recognition of roads and highways; classification of obstacles on roads and highways; automatic collision avoidance features; alerts regarding hazardous road conditions; to name only a few. In order to minimize the risks of failure of such AV systems, a system according to the present disclosure leverages the connectivity among AVs, thus enabling AVs to immediately share knowledge with one another and with the Cloud, thus increasing the overall safety of autonomous driving and navigation on the roads and highways.

To support the use and management of ADAS in AVs, a system as described herein may provide functionality that enables, configures, and/or manages collective learning (or nearby teaching), by sharing/forwarding local information in context (e.g., broadcasting of warnings/announcements/streamed information); and that identifies priorities and/or forms clusters among AVs at intersections, in case of accidents, when required to follow a particular AV or form a line of AVs (e.g., "platooning"), and when emergency vehicles or a platoon of vehicles are on the road, etc. A system as described herein may provide functionality that ensures that critical driving applications such as, by way of example and not limitation, "see-through," "blind spot" monitoring, lane/trajectory change assistance, the following of specific vehicles, a requirement to maintain a minimum inter-vehicle distance, overtaking maneuvers, collision warnings, etc., are provided with or gather look-ahead and predictive context information.

A system in accordance with various aspects of the present disclosure may provide functionality that supports instances where an emergency or catastrophe response is needed. Such a system may provide functionality and/or information that enables each AV to, for example, detect when an emergency vehicle is approaching the AV (e.g., via mesh networking); trigger/disseminate an emergency mode activation across the network connecting one or more AVs; allow AVs to detect that an emergency mode has been/should be activated; provide appropriate configuration and/or information for each AV to act as a mobile gateway to the Internet; allow real-time, data-driven dispatching of emergency vehicles/first responders; define how the AV infrastructure is to behave/operate in case of an emergency; and to permit others (e.g., a system operator, law enforcement, vehicle manufacturer) to remotely control AVs in case of emergency (fallback).

AVs are not expected to be able to function without having access to data, and will benefit from a data-driven communication infrastructure. Such data will be provided across the population of AVs, and will be tailored to the context or service in question. AVs will benefit from actionable data that is available on-time and at a per-vehicle level, with a resolution, granularity, and/or frequency that is tailored to the context or service in question, and that enable the AV to use such data to provide added-value to different applications. A system in accordance with various aspects of the present disclosure will provide dynamic, personalized, and flexible data management mechanisms that may, for example, aggregate contextualized data from multiple sources and sensors, where such data is tailored for different types of services and applications; enable the collection and fusion of different types of data, while enabling customized data filtering, at a vehicle or Cloud level; and provide APIs to enable customized configuration of data sensing mechanisms (e.g., sampling rates, resolution, frequency). Such a system may provide functionality and controls, for example, to enable data distribution for environmental awareness (e.g., context-aware look-ahead), including the deployment of the policies/thresholds that define whether or not to use the data; and deploy mechanisms for data prioritization (e.g., real-time (RT) or delay tolerant network (DTN) and in what order), as well as policies for data ordering, caching, and/or dropping. The system may also provide the functionality and controls, for example, to perform accounting of the levels of data usage (e.g., based on Bitcoin or credits to use; to allow different stakeholders, parties, fleets, and/or AVs to subscribe to different types, levels, and amount of data through well-defined APIs; and to integrate data from different stakeholders, parties, fleets, and/or AVs through APIs, while fostering data sharing through specific incentives/policies.

A system in accordance with various aspects of the present disclosure provides functionality for collecting and analyzing data to produce analytics that may be used for the operation, control, and management of AVs that, for example, may have self-driven and autonomous functionalities and services. Such AVs may have requirements and needs in terms of communication latency and bandwidth and may, for example, have a need to frequently perform data analytics and to quickly generate knowledge at or near the source of the data. A system as described herein may provide support to such AVs, which may employ local resources that might not be continuously connected to the Internet. A system in accordance with the present disclosure anticipates the operation, control, and management of AVs, as such autonomous vehicles become increasingly more intelligent than vehicles of today, in order to allow the functionalities and services of advanced AVs to behave and/or act as expected and in a reliable fashion. Such a system may be configured to continue to scale and expand the functionality and capabilities, as AVs are endowed with ever increasing computational, storage, and processing resources that allow such AVs to run applications that leverage on resource intensive algorithms such as, for example, object detection and classification, map localization, path planning, video streaming, etc. In addition, a system as described herein supports the operation, control, and management of AVs able to infer further knowledge through sophisticated machine learning or artificial intelligence techniques.

As the focus on the power of big data and analytics increases, a system according to various aspects of the present disclosure may be used to quantify, generate, and aggregate the type and amount of resources, data, and knowledge involved, and may be tailored to feed different services, locally or at the Cloud. Such a system may, for example, provide and/or produce sufficient data/knowledge and derive thresholds/policies to detect and enable just-in-time optimizations of services that may be done locally (e.g., at the edge), or adjust for their integration with fallback to the Cloud. A system in accordance with various aspects of the present disclosure may enable network optimizations through the use of collaborative and continuous shared learning that may be done locally (e.g., to relevant vehicles), or at the Cloud for general learning. Such systems may enable, for example, the detection of anomalies and exceptions in algorithms in use at AVs, and may, for example, send information about them to Cloud, perform corrections or adjustments to the algorithms, and/or send such corrections or adjustment back to AVs. A system in accordance with the present disclosure may log, aggregate and analyze data network connectivity, AV mobility, and data traces of AVs, and may derive patterns of road/highway usage, AV trips, the locations of end-users, and various demands upon the AVs and the system. A system as described herein may also operate to increase AV location accuracy by, for example, correlating GNSS/GPS data of different AVs and integrating such data into value-added maps of expected AV routes, destinations, and origins.

A system in accordance with aspects of the present disclosure provides the functionality that may be needed to support various managed services and applications. Such a system may enable different companies whose goals are to make the cities and fleets smarter, to optimize the operation of a data-driven communication infrastructure and the AVs that it serves by communicatively coupling the AVs to one another and to the Cloud, while making it possible for MaaS providers to get the connectivity and data that they need. In this way, a system as described herein makes it possible for operators of FAVES to, for example, better define AV trips, optimize the operation of FAVES in real-time, enable new forms of AV sharing to ease congestion and lower transportation costs for riders, and provide urban, road, transportation, and fleet planning departments with unprecedented data used to drive their decisions regarding FAVES planning, operation, and maintenance.

In order to help improve management of services and applications, a system according to aspects of the present disclosure may, for example, enable customers, clients, and/or developers to access and deploy services in the same shared AV infrastructure through Software Defined Networking (SDN)/Network Function Virtualization (NFV) functions; and to deploy private, secure, transparent, and portable APIs to access the High-Definition (HD) data (a.k.a., data with high-granularity) and services that may be available at a vehicle and/or Cloud level. A system as described herein may, for example, feed various services with data, events, video streaming and contents, detailed reports, and analysis, and alerts of their usage, health, and diagnostics, making providers, customers, and/or clients more aware of their services. Such a system may enable secure, contextualized, customized, and predictive announcements, advertisements, broadcasting and management of relevant data, events, video streaming and contents to feed such services. A system according to aspects of the present disclosure may determine and prioritize the data that will be relevant for each single service, AV, operator, customer, and/or client based on their needs and requirements; and may make the operation of service "over-the-air" update mechanisms more modular, flexible, reliable, and accountable, while enabling the deployment of management, monitoring, and configuration functions as managed services.

AVs may perform large numbers of real-time, resource-intensive, and critical actions while on-the-move, and most of these actions may be decided and performed locally, without interacting with functionality in the Cloud, because Cloud-based systems might only be accessible through high-latency and/or low-throughput communication links, and/or might not have all the data available that may be used in making accurate and synchronized decisions. A system according to the present disclosure may provide the support needed to enable AVs endowed with such decision-making capabilities to collaborate with one or more nearby AVs and/or with other devices at the edge of the network, which may be locally available. By enabling the operation of distributed, collaborative, and coordinated decision makers, a system according to the present disclosure may enable AVs to leverage information and computing resources of their neighbor devices to carry out substantial amounts of data storage, communication, configuration, measurement, and management functions. This may occur, for example, when the AVs do not have sufficient resources available. In some situations, an AV may, for example, contact resources in the Cloud for increased redundancy or fallback. In this context, a system in accordance with aspects of the present disclosure may provide mechanisms that enable AVs to, for example, provide open and secure APIs to allow AVs from different fleets/owners to announce, advertise, discover and start collaborating with each other in an ad-hoc or peer-to-peer (P2P) fashion, in order to resolve together any coordinated decision that affects the behavior of any data/control/service function. Such a system may enable an AV to, for example, detect whether any decision or management function may be done locally or should be done at the Cloud level, by considering the scope/locality of the function, and a required level of redundancy/fallback. A system as described herein may allow for different levels of interoperability that may include, for example, operability between vehicles, operability from a vehicle to the Cloud (e.g., map information, video streaming, etc.), and operability from the Cloud to a vehicle (e.g., map information, OS updates, etc.) based on, for example, the various communication technologies available (e.g., V2V, V2I, cellular, etc.), the origin of the data (e.g., vehicle, end-user device, sensor, network), and/or the location of data consumers. A system according to the present disclosure may, for example, provide mechanisms to enable distributed negotiations and consensus in the network of AVs, by providing a means for other devices to request needs and to enable AV election and/or enforce AV prioritization when required to perform any distributed action in the network.

When operating a FAVES for MaaS, multiple entities may interact and/or collaborate in order to support service-driven business models built on top of a shared communication and management infrastructure that communicatively couples the AVs. The entities may include, by way of example and not limitation, transit and transportation stakeholders, fleet operators, governmental and legal agencies, AV manufacturers, infrastructure owners, municipal authorities, service providers, and insurance companies. A system in accordance with aspects of the present disclosure may enable various AV-based business models, including functionality related to service pricing and taxation (e.g., data-driven assessment value), payment and charging, incentives, exemptions, cost sharing, travel planning/scheduling, parking space/slot management, road/highway management, delivery management, and weight management.

A system in accordance with various aspects of the present disclosure may provide functionality that helps to make the business models flexible, usable, and scalable, while maximizing the likelihood of using shared AVs. Such a system may operate to, for example, gather the RT and DTN data used to feed the MaaS business models; provide a set of standard open APIs for data access to aid in fostering competition; enable access to and accounting of data related to, for example, any forms of payment accepted for services rendered (e.g., new Bitcoin-based business models such as, pay per data, pay per use, etc.; and provide functionality that supports improvements to customer/client business models by analyzing the impact of data, mobility and connectivity patterns and trends. A system according to various aspects of the present disclosure may provide tools to, for example, determine the impact of the business models on the revenue/costs for any entity sharing the AV infrastructure.

A system according to various aspects of the present disclosure provides functionality that supports a variety of AV tasks and/or actions including, but not limited to, traveling, parking, and or charging. Such a system may, for example, provide functionality used to support travel associated with the pickup, transfer, and offload of passengers, goods, or data, in addition to the actions of traveling to a charging station or a parking slot/space. In addition, an AV travel action may take place to move an AV to a location at which it is needed to perform the above travel actions. A system as described herein may plan, schedule, and/or coordinate such travel actions. In addition, the system may plan, schedule, and/or coordinate a number of activities of the AV during the act of traveling including, for example, uploading and/or downloading data to/from the Cloud; acting as a mobile gateway to the Internet; acquiring and sensing relevant context information for local or general learning; detecting unexpected events and/or behaviors; locally broadcasting, announcing, advertising, and/or sharing media content; providing support for local and/or global services; and providing Internet access to occupants of the AV.

A system in accordance with aspects of the present disclosure may also support functionality related to periods of time when the AV is parked such as, for example, planning, scheduling, and/or coordinating the uploading and/or downloading by the AV of data to/from the Cloud; providing a stable and reliable gateway to the Internet for end-users in the vicinity of the AV; and providing new or additional connectivity of a wireless access infrastructure.

The network-based and transportation-related tasks or actions that may be performed by AVs such as, for example, travelling, parking, gathering data, enabling communications, providing support for services, and providing transportation of people and/or goods each occur within a context. A system in accordance with the present disclosure may use information about context as input to algorithms, functions, and/or policies that may determine whether or not the AV is to, by way of example and not limitation, provide wireless connectivity to vehicle occupants; store or advertise data; travel over a particular route; remain stopped at a certain location; proceed to a charging station or parking place; and/or act as an urban sensor or data courier. It is clear that the example actions listed above are not only related to providing wireless connectivity, but that such actions also affect the AV ecosystem. Additional details are provided below regarding various sets of context information that may affect the AV behavior and/or functionalities.

Various examples of the AV (or components thereof) operating as a data collector and/or courier may, for example, be found in U.S. patent application Ser. No. 15/213,269, filed Jul. 18, 2016, and titled "Systems and Methods for Collecting Sensor Data in a Network of Moving Things;" U.S. patent application Ser. No. 15/228,613, filed Aug. 4, 2016, and titled "Systems and Methods for Environmental Management in a Network of Moving Things;" U.S. patent application Ser. No. 15/245,1242, filed Aug. 24, 2016, and titled "Systems and Methods for Shipping Management in a Network of Moving Things;" U.S. patent application Ser. No. 15/337,856, filed Oct. 28, 2016, and titled "Systems and Methods for Optimizing Data Gathering in a Network of Moving Things;" U.S. patent application Ser. No. 15/428,085, filed on Feb. 8, 2017, and titled "Systems and Methods for Managing Vehicle OBD Data in a Network of Moving Things, for Example Including Autonomous Vehicle Data;" U.S. Provisional Patent Application Ser. No. 62/350,814, filed Jun. 16, 2016, and titled "System and Methods for Managing Contains in a Network of Moving Things;" the entire contents of each of which is hereby incorporated herein by reference for all purposes.

Various example aspects of vehicle positioning or route or travel control, vehicle tracking, vehicle monitoring, etc., may, for example, be found in U.S. patent application Ser. No. 15/215,905, filed on Aug. 4, 2016, and titled "Systems and Methods for Environmental Management in a Network of Moving Things;" U.S. Provisional Patent Application Ser. No. 62/415,196, filed Oct. 31, 2016, and titled "Systems and Method for Achieving Action Consensus Among a Set of Nodes in a Network of Moving Things;" U.S. Provisional Patent Application Ser. No. 62/336,891, filed May 16, 2016, and titled "Systems and Methods for Vehicular Positioning Based on Message Round-Trip Times in a Network of Moving Things;" U.S. Provisional Patent Application Ser. No. 62/377,350, filed Aug. 19, 2016, and titled "Systems and Methods for Flexible Software Update in a Network of Moving Things;" U.S. Provisional Patent Application Ser. No. 62/360,592, filed Jul. 11, 2016, and titled "Systems and Methods for Vehicular Positioning Based on Wireless Fingerprinting Data in a Network of Moving Things;" U.S. Provisional Patent Application Ser. No. 62/415,268, filed Oct. 31, 2016, and titled "Systems and Methods to Deploy and Control a Node in a Network of Moving Things;" U.S. patent application Ser. No. 15/351,811, filed Nov. 15, 2016, and titled "Systems and Methods to Extrapolate High-Value Data from a Network of Moving Things;" and U.S. Provisional Patent Application Ser. No. 62/417,705, filed Nov. 4, 2016, and titled "Systems and Methods for the User-Centric Calculation of the Service Quality of a Transportation Fleet in a Network of Moving Things;" the entire contents of each of which is hereby incorporated herein by reference.

A system according to aspects of the present disclosure may gather and/or employ a variety of characteristics or parameters for each of a number of different types of AV contexts. For example, such a system may include functionality that supports entry, collection, and/or use of various characteristics or parameters of a geographic region such as, for example, a city, county, state, province, and/or country. In the context of a geographic region, characteristics such as, for example, the density of available access points (APs) may be stored and used in selecting the routes of AVs, thus providing high-quality and low-cost connectivity for Internet access and upload/download data to/from the Cloud. A system as described herein may employ information about the physical/geographic location(s) of various possible sources of end-user demands that may be placed upon AVs of a FAVES, to optimize the trips of AVs, and/or the number of AVs to be made available at specific geographic locations in order to meet end-user demand for wireless service or transportation at the locations of groups of end-users (e.g., where crowds are located), thus reducing the time that end-users wait for the service(s) provided by the AVs.

A system in accordance with various aspects of the present disclosure may use information about unexpected events in a particular geographic region (e.g., a city) such as, for example, road obstructions, vehicle and/or pedestrian accidents, and/or the closing of roads/highways to allow the system to feed such details to AV trip planning algorithms, as soon as possible. The population of a particular geographic region may also be taken into account by such a system, in that the algorithms used to schedule AVs for the particular geographic region should take into account the density and demographics of the potential end-users in that geographic region, and whether the geographic region is an urban, suburban, or rural area. For instance, the system may plan for an AV that is leaving a city at the end of the day, to wait for more people that will travel to the same region.

A system according to aspects of the present disclosure may, for example, include functionality that supports entry, collection, and/or use of various characteristics or parameters of a network of various types and sizes of roads (e.g., streets, highways, tollways, and the like). For road pricing purposes, such a system may take the type of road (e.g., a municipal road or highway, a one-lane or a two-lane road, whether a toll is charged on the road/highway, whether the road is urban or rural, etc.) into account when planning AV routes, scheduling trips, etc. Such a system may, for example, support the entry, collection, and/or use of various characteristics or parameters related to road congestion and usage. For example, if an end-user chooses to make a trip over a congested road, the end-user may be required to pay a fee based on the levels of congestion of the road on which they choose to travel. A system in accordance with the present disclosure may, for example, operate with a goal of balancing trips over the available roads. In a similar way, a system in accordance with the present disclosure may make it possible for end-users to pay more for travel over a less congested road/route, if such a road/route is available. A system described herein may use information about the density of AVs traveling various roads, may detect that the number of AVs traveling over a specific road is increasing, and may use such information to predict, in advance, which roads should be used to perform trips.

A system according to aspects of the present disclosure may also support the entry, collection, and/or use of various characteristics or parameters related to road conditions. Such a system may monitor obstacles or other problems on the roads used by AVs. The system may be able to predict such obstacles (e.g., based on historical information on road obstructions/issues of the roads of interest), and may advertise such information to AVs and/or system located in the Cloud, in advance, to aid in quickly finding alternate routes for AVs. For road pricing purposes, trips over roads that are in poor condition or that impede travel may be considered to be relatively more expensive, as further travel on such roads makes those roads worse, and may cause additional wear and tear on the AVs in use.

A system according to aspects of the present disclosure may also support the entry, collection, and/or use of various characteristics or parameters related to vehicle parking. Such a system may use such information to direct AVs that are waiting for riders to, for example, move to a traditional parking space/slot, or to continue moving about to find additional riders. Also, the system may use demand information in terms of end-users, connectivity, and data to feed algorithms that decide whether AVs will stay parked to, for example, increase coverage or act a reliable gateway for Internet, or to travel when carrying people or goods. Example details of various systems and methods for performing such operation may, for example, be found in U.S. Provisional Patent Application Ser. No. 62/449,394, filed Jan. 23, 2017, and titled "Systems and Methods for Utilizing Mobile Access Points as Fixed Access Points in a Network of Moving Things, for Example Including Autonomous Vehicles," the entire contents of which is hereby incorporated herein by reference for all purposes.

When an AV has more than one parking place available near a trip destination, characteristics or parameters related to the cost, size, and congestion of those parking places may be evaluated by a system of the present disclosure, to aid in the selection the best parking place at the current time. In addition, when an AV is nearing the destination of the current trip and parking places are available along the trip route, a system such as that described herein may use characteristics or parameters such as, for example, those indicative of road congestion and parking place availability to decide whether to park or to continue traveling, right up to the point of arrival at the trip destination.

A system according to aspects of the present disclosure may also support the entry, collection, and/or use of various characteristics or parameters related to the charging of AV batteries. For example, when the level of charge of the batteries of an AV drops below a certain threshold, a system according to the present disclosure may evaluate the level of charge and the occupancy of nearby charging station(s) to aid the AV in determining whether the AV should stay parked (e.g., acting as a reliable gateway for the Internet) rather than continuing to travel and thereby consume the remaining battery power, or that the AV should share some actions (e.g., carrying end-users or goods) with nearby AVs. Information about the limited electric budget that the AVs may have to perform their operations may be evaluated by such a system. In addition, a system according to the present disclosure may evaluate characteristics and parameters representative of the occupancy/congestion and size/charging capacity of the charging stations currently available, in order to reduce the time that AVs spend charging.

Although the present disclosure frequently describes AVs that employ electricity for propulsion, some AVs may, for example, use other sources of energy. For AV pricing purposes, a system in accordance with aspects of the present disclosure may use characteristics and parameters entered and/or collected by the system to evaluate the fees charged end-users based on the source of energy (e.g., type of fuel) used to operate the AV so that, for example, pricing of end-user fees for use of AVs may be adjusted according to costs of operation, operator and/or governmental policies (e.g., higher usage fees for AVs powered by less-efficient and non-renewable sources of energy).

A system according to aspects of the present disclosure may also support the entry, collection, and/or use of various characteristics or parameters related to fleets of AVs, where the fleets may be of different types of AVs and/or have different owners/operators. For example, there may be different types of public or private fleets of AVs, and each of those fleets may, for example, be operated by a different entity, may run different services, and/or may perform heavy or light operations. A system in accordance with the present disclosure may take into account such information in an AV selection function as, for example, one or more end-user preferences.

A system according to aspects of the present disclosure may, for example, enable balancing the trips requested of a fleet, or the services running on the AVs of a fleet, among all of the AVs of the fleet. Such a system may provide the functionality to permit assignment of priorities to each of the applications running on an AV, to enable management of the limited network resources and/or data capacity of the AV.

Such a system may also provide functionality that enables selection of an AV from a public fleet. Such functionality may be configured to support end-user preferences such as, for example, an end-user preference for an AV having routes that run more frequently, in order to minimize end-user delays, or an end-user preference for an AV that offers a larger number of infotainment services, for end-user convenience and enjoyment.

A system according to aspects of the present disclosure may also support the entry, collection, and/or use of various characteristics or parameters related to features of the AV itself. For example, such a system may be configured with functionality that enables end-users, operators, maintenance personnel, and/or any other authorized individuals or entities to determine the current weight and available space of an AV, to enable one to check, for example, whether an AV has available capacity for additional riders or additional goods. Such information about current weight or available space for riders or goods may be available in real-time to enable, for example, operators to be apprised of situations in which items have been left on an AV (e.g., bags/babies/bombs), by verifying that the weight of the AV before the boarding of a passenger and the weight of the AV after the passenger disembarks, is the same. In addition, a system according to the present disclosure may use such functionality to avoid operating AVs as "zombie cars," that is, AVs that are traveling without passengers, goods, or a purpose for traveling.

A system in accordance with the present disclosure may also support the entry, collection, and/or use of characteristics and/or parameters related to taxes and priority of operations regarding AV activities. Such a system may provide particular functionality supporting AV operation that, for example, is to be exempt from taxes, and/or to give priority to AVs that are travelling due to an emergency (e.g., ambulances, fire service workers, police cars, etc.), those that perform special services (e.g., pharmacy AVs that transport medicines and/or medical supplies, AVs that transport the handicapped, etc.), or AV actions related to a response to a catastrophe. In a similar fashion, such a system may enable the application of particular taxes to the operation of AVs that are considered to be highly polluting vehicles, AVs that are part of a fleet that currently has too many vehicles on the road(s), or other aspects of operation.

A system according to aspects of the present disclosure may also support the entry, collection, and/or use of various characteristics or parameters related to the occupants of the AVs. For example, such a system may provide functionality that allows for the configuration of the cadence, speed, and/or type of advertisements displayed in/on the AV; the selection, operation, and/or the adjustment of applications and services running on AVs according to the age, mood, and/or preferences of the occupants of AVs. In addition, such a system may enable the location and availability of AVs to be targeted to the habits and routines of people working or living in different regions or areas served by the AVs. Further, a system as described herein may provide functionality that permits end-user fees for AV travel to take into consideration the urgency that occupants have to reach a specific place or to move from point A to B.

A system in accordance with aspects of the present disclosure may enable the end-users to choose, book, and pay for their AV trips through their preferred payment options or methods. Such a system may, for example, permit end-user subscription for AV services, using a unified end-user application, which may be configured to operate across different geographic regions (e.g., villages, towns, cities, provinces, regions, states, countries, etc.) and may support end-user access to multiple AVs and fleet operators. Such a system may be configurable to permit end-users to pay a designated fee for a certain number of travel credits or travel miles, or to perform a designated or unlimited number of trips during a particular period of time (e.g., a day, a month, etc.), but to also be able to pay per trip taken.

A system in accordance with the present disclosure may also provide functionality to collect and use the feedback of AV occupants. Such a system may permit operators of the system to review end-user AV trips and indications of the cost, duration, and convenience of end-user trips, and may derive indicators representative of satisfaction/reputation for each AV operator, to enable the operators of AVs to improve their operations and functionality.

A system according to aspects of the present disclosure may also support the entry, collection, and/or use of various characteristics or parameters related to the AV transportation services for goods. Such a system may, for example, enable those using such transportation services to designate delivery times/intervals of goods, and the system may, when determining fees and/or prices for such services, take such into consideration the designated delivery times/intervals for each delivery. In addition, such a system may enable the reservation of delivery slots that may be taken into account in the scheduling AVs trips. The system, in regard to scheduling of AVs trips, may also take into consideration the total amount of goods (and in some instances, riders) to be transported to the same location. A system in accordance with the present disclosure may, for example, schedule a trip to move goods to a specific location only when there is a sufficient (e.g., above a location threshold) amount of goods destined for the same or a nearby location.

A system according to various aspects of the present disclosure may support the entry, collection, and/or use of various characteristics or parameters related to AV trips. For example, such a system may enable end-users to combine or give preference to various modes of transportation (e.g., car, van, bus, train, etc.) when planning an AV trip to travel from point A to B. The system may permit end-users check cost and availability of the various modes of transportation, as well as choosing modes of transportation such as, for example, walking and cycling. Such a system may permit the end-user to set different goals, costs, optimizations, purposes, and/or priorities for each trip. For example, the end-user may choose to indicate that the trip is to move people, data, and/or luggage; to sense/acquire data; to go to a parking place or charging station, or other trip options. The system may permit the end-user to indicate a preference for trips having at most a certain number of stops (e.g., 0, 1, 2, 3, etc.) that will not affect their perceived quality of experience (QoE).

A system in accordance with aspects of the present disclosure may provide the functionality of a common platform for trip planning and payment. Such a system may, for example, permit end-users to share costs with other end-users, and permit the system operator to define, for example, what end-users will pay for each trip or for a set of miles per month. The system may, for example, be configured to provide incentives to end-users to not waste any miles/credits that may remain at the end of a month. Further, such a system may enable AVs to trade trips and costs, based on the amount of resources, data, end-users/occupants/riders, actions, states, and routes that the AVs share. The system may also permit trips by AVs to be prioritized, based on a purpose (e.g., transport people, transport goods, transport data, etc.) or according to a context such as, for example, a normal/regular trip, an urgent trip (e.g., delivering urgent personal, business, and/or government document/data/goods), and/or an emergency trip (e.g., carrying police, fire service, medical personnel/medicine/medical supplies, etc.). The system may provide incentives for end-users and/or suppliers to pick-up/drop-off a certain number of people and/or goods at the same origin/place/destination, at the same time, and may, for example, derive trip fees based on the distance travelled the end-user/goods.

A system according to aspects of the present disclosure may support the entry, collection, and/or use of various characteristics or parameters related to trip fees. Such a system may include functionality that determines trip fees based on location or speed of AVs and the routes that the AVs travel. AV behavior and/or actions may be taken in to account by the system, and the system may consider the expected distance and/or time to arrive at a certain location (e.g., charging station, parking place) in the calculation of trip fees. A system according to the present disclosure may, for example, use the time of day as a factor influencing the number of AVs traveling each road, and/or the number of AVs to be scheduled at a certain location.

A system according to aspects of the present disclosure may also support the entry, collection, and/or use of various characteristics or parameters related to a data network used by the AV. Such a system may enable an operator/client to map various services and/or applications running on AVs to the different communication technologies (e.g., Dedicated Short Range Communications (DSRC) (e.g., IEEE 802.11p), Wi-Fi (e.g., IEEE 802.11a/b/g/n/ac/ad), cellular (e.g., 4G (LTE), 5G, etc.) or network configurations available. The system may provide functionality that permits such mapping to take into account types of access points (APs), support of mobility by the communication technology, a level of security supported/provided by a communication technology, agreements, etc.).

A system according to aspects of the present disclosure may enable any kind of decision, action, or communication performed within an AV to be evaluated based on the scope/locality of the decision, action, or communication. For example, a system such as described herein may, for example, enable decisions, actions, and/or communications that involve only the AV; that affect other AVs that are nearby an given AV; and/or that affect an entire fleet of AVs through, for example, services of or communication via the Cloud. Such a system may, for each kind of decision, action, and/or communication performed within a supported AV, take into account the level of redundancy or reliability that is required, and/or the level of interoperability that is involved including, for example, between vehicles (i.e., V2V); from a vehicle to the Cloud (i.e., V2I), e.g., mapping info or maps, video streaming, etc.; and from the Cloud to a vehicle (i.e., I2V), e.g., maps or mapping information, operating system (OS) updates, etc.).

A system according to various aspects of the present disclosure may support the entry, collection, and/or use of various characteristics or parameters related to various levels of network congestion. Such congestion may, for example, be in the form of messages or other data transported over a wireless or wired network. Such a system may support the entry, collection, and/or use of various characteristics or parameters related to network congestion such as, for example, the number of AVs on roads; the amount of data now flowing or that has been transported in the past, to/from the Cloud; the number of messages/sessions/communications occurring within a geographic region or area (e.g., village, town, city, county, province, state, etc.) or at a specific geographic location; bandwidth requests from different AVs; and trip requests from different end-users, clients, etc. A system in accordance with various aspects of the present disclosure may take such characteristics or parameters into account when determining/planning/scheduling what actions an AV may perform or which road an AV may travel.

A system according to aspects of the present disclosure may also support the entry, collection, and/or use of various characteristics or parameters related to the data being communicated and/or transported. For example, such a system may classify and/or prioritize the type of data to be sensed, transmitted, dropped, and/or shared (e.g., media content, sensor data, advertisements, notifications, end-user data, etc.) based on the requirements or needs of the various stakeholders, fleets, AVs, and/or parties (e.g., operators, clients, end-users).

A system according to the present disclosure may include functionality that enables the entire AV ecosystem take into account the origin of data being communicated and/or physically transported, both in terms of the entity that owns or publishes such data (e.g., a vehicle, end-user, sensor, network, etc.), the location of consumers of such data (e.g., fleet operators, telecommunications companies, insurance companies, vehicle occupants/riders/end-users, etc.), and the applications and/or services that request such data.

A system according to the present disclosure may, for example, provide APIs to permit an end-user and/or client to subscribe to various types of data services and/or an amount of data transported by a subscription service; to assign credits to end-users and/or clients to enable such to use a particular communication service or communicate a certain amount of data involved in performing a particular action; and/or to monitor and track (e.g., perform accounting on) the amount of data usage of an application, an end-user, and/or a client.

Such a system may take into account the urgency of the data, which may be used by the system to influence decisions such as, for example, whether a particular piece of data is to be sent in real-time, or may be communicated using delay tolerant networking, and whether such data is to be given priority over other types of data. Such a system may enable the entry, collection, and/or use of various policies regarding, for example, the ordering of data, the caching/storage of data, and/or the dropping of data by AVs or other elements. Example system and method aspects related to such delay tolerant networking may be found in U.S. patent application Ser. No. 15/353,966, filed Nov. 17, 2016, and titled "Systems and Methods for Delay Tolerant Networking in a Network of Moving Things, for Example Including a Network of Autonomous Vehicles," the entire contents of which is hereby incorporated herein by reference for all purposes.

A system according to various aspects of the present disclosure may support the entry, collection, and/or use of various characteristics or parameters related to services provided by AVs. Such a system may include the functionality to enable AVs to give priority to specific types of services such as, for example, those services related to safety including, for example, police/law enforcement, fire service, medical/ambulance services (i.e., "first responders"). A system according to the present disclosure may take into account the preferences and/or needs of those requesting a specific service, or the context or environment in which that service is to be applied. A system as described herein may, for example, enable configuration of AVs and data network elements appropriately for each service to be provided, taking into consideration an amount of data used by a given service, the amount of processing power that may be involved in running complex functions or algorithms associated with provision of a given service, and/or whether high-bandwidth/low-latency links are required by a given service to be provided either in centralized or in a distributed way, either at a vehicle (e.g., AV) or a Cloud level.

A system in accordance with various aspects of the present disclosure may be configured to optimize the operation of a network of autonomous vehicles including, for example, minimizing the amount of time spent by an AV looking for parking places or charging stations; minimizing the amount of time spent waiting for a nearby parking place or a charging station; and/or minimizing the number of AVs per road segment or overall road congestion by AVs. Such a system may also optimize the operation of a network of AVs by, for example, maximizing the amount of time that an AV is travelling without being empty; and/or minimizing the amount of time spent transferring a payload (e.g., a person, an item, and/or data) from point A to point B. A system according to the present disclosure may optimize operation of a network of AVs by, for example, maximizing the amount of data offloaded by the AV, while minimizing the amount of data offloaded at the same location or through the same wireless access point.

Such a system may enable one or more AVs to increase wireless connectivity coverage, and may enable configuration of a network of AVs to minimize the data latency and increase network data throughput, while providing connectivity to end-user devices. A system according to the present disclosure enables an operator to maximize the amount of data connectivity provided to the activities in a geographic region (e.g., village, city, county, province, state, etc.), while maximizing the safety and security of operation of one or more AVs. Such a system enables an operator of a network of AVs to maximize the QoE provided by an AV or a fleet of AVs, and to distribute resource usage among all the AVs of a fleet.

There are large numbers of AV services and applications that may involve high-bandwidth and low-latency communications. AVs may operate in different working modes or states, and therefore may need access to relevant context information, to enable the operations/actions that the AVs will perform in those states. Each AV may require different degrees or levels of wireless connectivity in terms of, for example, the communication technologies used (e.g., DSRC, Wi-Fi, cellular, etc.), the amount of network bandwidth needed, and requirements regarding the amount of network latency that the services and/or applications of the AVs are able to tolerate. In addition to transporting people or goods, AVs may also be used to acquire and transport data. Therefore, some trips and wireless connectivity opportunities may need to be evaluated while keeping in mind not only the transportation of people and/or goods, but also service and application opportunities that are focused on the acquisition and transportation of data.

Many of the services and applications running on an AV are primarily interested in maximizing their communication network throughput or minimizing their packet latency, independent of the types of communication technologies (e.g., connectivity) or the amount of radio frequency (RF) spectrum available to the AV. In accordance with various aspects of the present disclosure, the control of access to the wireless connectivity resources of an AV may be selective and context-aware, and is not handled as a simply first come, first served arrangement. In accordance with the present disclosure, certain services and/or applications of an AV may be given higher priority access to wireless connectivity resources of the AV such as, for example, services and/or applications that deal with issues regarding safety/emergency, or services and/or applications that manage and/or perform updates to the AV software and hardware. In accordance with the present disclosure, each service or application resident on an AV may have a different scope. For example, in a first example scenario, a service and/or application may be performed entirely on a single AV, while in a second example scenario, the service and/or application may involve actions of a group of two or more AVs that are near one another and may involve the help of a fixed access point (AP). In a third example scenario, a service and/or application may involve actions of a system in the Cloud. In accordance with aspects of the present disclosure, the type of wireless connectivity (e.g., the communication technology such as DSRC, Wi-Fi, cellular, etc.) and the allocation of connectivity resources (e.g., the amount of bandwidth, RF spectrum) to the service or application may be tailored according to the service or application. In accordance with aspects of the present disclosure, some decisions regarding connectivity may be done in-advance, to take advantage of specific context and connectivity opportunities available at a particular time.

Aspects of the present disclosure define an intelligent, adaptive, and context-aware method and system for connectivity and technology selection in the AV space, which encompasses a number of features. For example, an AV in accordance with various aspects of the present disclosure may classify the services/applications running on the AV, may identify the communication requirements of those services/applications, and may map those communication requirements to a set of communication technologies or pieces of available RF spectrum. AVs according to aspects of the present disclosure may prioritize some applications over others by, for example, giving a higher priority to serving the communication needs of applications requiring high-capacity, high-throughput, low-latency communication, or to those applications that are location-aware.

An AV in accordance with various aspects of the present disclosure may receive triggers from critical applications (e.g., applications or services related to safety such as medical/fire/law enforcement, etc.) or network nodes that are within communication range of the AV, and may provide limited access to connectivity to those non-critical applications or specific network nodes. An AV according to the present disclosure may, for example, take into account information in what may be referred to herein as a "profile" of the AV. An "AV profile" may, for example, characterize actions that an AV may perform when operating in one or more specific states (e.g., charging stage, transporting stage, parking state, etc.) based on a specific situation/category/context (e.g., operating as a data courier, collecting data from sensor(s), communicating via RF wireless communication (e.g., providing Wi-Fi (e.g., IEEE 802.11a/b/g/n/ac/ad) connectivity for nearby network nodes (e.g., AVs) or end-user devices), provide communication/transport in emergency/catastrophe situations, etc.). Providing communication, transportation, and/or data collection support in such situations may involve assigning priorities for use of wireless connectivity/access by different applications based on different profiles (and those profiles may be driven and/or triggered by different entities, e.g., self on AV, network, factory, context, etc.). Several triggers may be defined to change AV operation from one state to another, and thereby change the wireless connectivity features that should be made available. An AV in accordance with various aspects of the present disclosure may constantly monitor the quality of each service or application that is being provided by the AV (e.g., in terms of quality of service (QoS) or quality of end-user experience (QoE)), and may automatically adapt the amount of bandwidth/capacity, the type(s) of communication technologies, and/or the times slots allocated to provide wireless connectivity used to feed each service or application.

Figure 5:
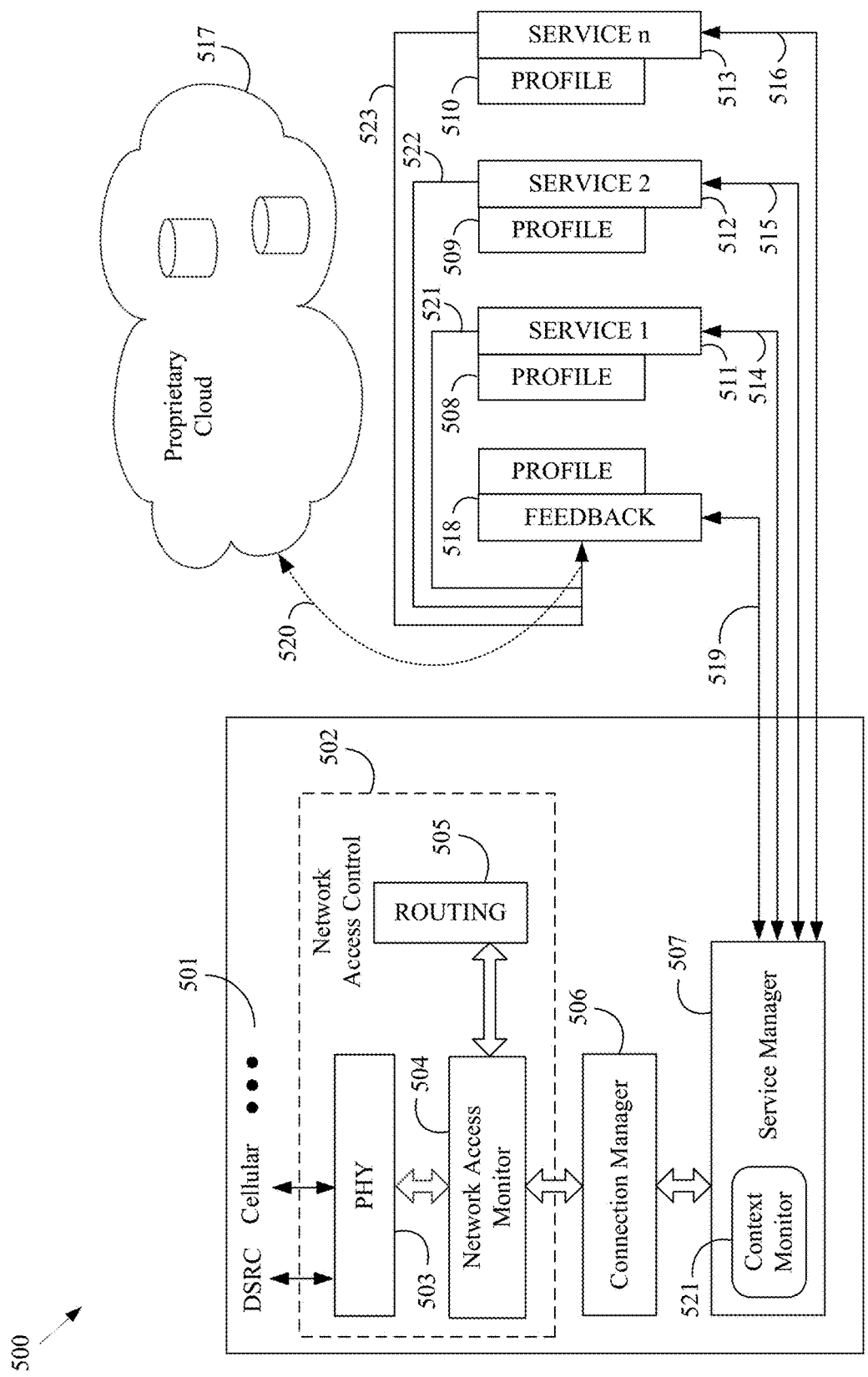
FIG. 5 is a block diagram that illustrates an example architecture of a system that may reside in an autonomous (AV) operating in a network of moving things, in accordance with various aspects of the present disclosure.

FIG. 5 is a block diagram that illustrates an example architecture of a system 500 that may reside in an AV operating in a network of moving things, in accordance with various aspects of the present disclosure. The example system 500 may, for example, share any or all characteristics with the other example methods, systems, networks and/or network components 100, 200, 300, 400, and 600, discussed herein (e.g., MAPs, FAPs, etc.).

At any point in time, the example AV system 500 may support the air interfaces of any of a number of different communication technologies 501, using physical layer interfaces (PHY) 503 (and/or MAC layer interfaces) that may include, for example, Direct Short Range Communication (DSRC) (e.g., IEEE 802.11p), wireless cellular service (e.g., Code Division Multiple Access (CDMA), Time Division Multiple Access (TDMA), Universal Mobile Telecommunications Service (UMTS), Global System for Mobile communication (GSM), "3G," "4G," Long Term Evolution (LTE), "5G"), Bluetooth, Wi-Fi (IEEE 802.11a/b/g/n/ac/ad), Ethernet, etc.). The available communication technologies may be used to fulfill different communication requirements of the services and/or application running on the AV system 500 including, for example, throughput/bandwidth requirements, delay/latency requirements, data security requirements, and communication range (i.e., physical distance) requirements. The example AV system 500 illustrated in FIG. 5 includes a number of different functional blocks including a network access control (NAC) block 502 that comprises a physical layer interface (PHY) block 503, a network access monitor block 504, and a routing block 505. The AV system 500 also comprises a connection manager block 506, and a service manager block 507 that communicates with services Service 1 511, Service 2 512, and Service n 513. Note that a block may also be referred to herein as a module.

The network access control (NAC) block 502 of FIG. 5 represents the functionality of the low-level, system layer that manages and monitors communication channel access for each communication technology. The PHY block 503 of the NAC block 502 may be responsible for translating each communication requirement from the network access monitor 504 to features of a specific wireless communication standard covering a certain wireless communication technology.

The network access monitor block 504 of FIG. 5 represents functionality that monitors and selects which configuration is to be applied to each available communication technology. Each communication technology may be configured in a specific way, depending on the device in use. The network access monitor block 504 may interact directly with the PHY block 503, based on requests issued by the connection manager block 506. A "successful" configuration is a configuration for which the PHY block 503 returns a "success" indication, upon the configuration being applied by the network access monitor block 506. The network access monitor block 504 may, for example, keep track of the current status (e.g., channel availability, channel load, signal strength, number of end-users currently connected, etc.) of each communication channel of each communication technology. The network access monitor block 504 may also be responsible for notifying the routing block 505 about new successful configurations, so that the routing block 505 may act upon the known new configurations, and may enable Internet Protocol (IP) routing if needed. For example, in accordance with aspects of the present disclosure, a network access monitor (e.g., network access monitor block 504) may report to a higher protocol layer that a new neighbor is offering Internet access via a certain communication technology (e.g., DSRC) using a particular "channel" (e.g., channel 180). The higher protocol layer may, at some future time, request a connection via the Internet access capability of the new neighbor. In such a situation, the network access monitor may request that the PHY (e.g., PHY block 503) provide a configuration of a device to enable use of the certain communication technology (e.g., DSRC) via the particular channel (e.g., channel 180). If a device capable of employing the certain communication technology (e.g., DSRC) is able to be configured to operate on the particular channel (e.g., channel 180), the PHY (e.g., PHY block 503) may then return an indication of "success" to the network access monitor (e.g., network access monitor 504), which then reports to the higher protocol layer that the request was applied successfully.

In accordance with various aspects of the present invention, the connection manager block 506 may act on requests from the service manager block 507, and may make use of communication technology availability and current status information reported by network access monitor block 504. The connection manager block 506 may signal back to the service manager block 507, the establishment of a requested connection to a specific service. The connection manager block 506 may handle the networking part of the system configuration for a specific wireless connection, allowing the system to use a certain communication technology/communication channel. The connection manager block 506 may also provide a way for the service manager block 507 to request of the connection manager block 506 that, for example, a certain fixed access point (FAP) be "blacklisted," or that availability of a specific communication technology be ignored, even if the network access monitor block 504 has reported that specific communication technology as available (e.g., valid).

The service manager block 507 of FIG. 5 may, for example, react to the registration of a new service profile 508, 509, 510 of a corresponding Service 1 511, Service 2 512, or Service n 513, by translating the new service profile 508, 509, 510 into the form of a request to the connection manager block 506. Such a request for a Service 511, 512, 513 may, for example, identify a specific communication technology that is to be used with the requested service including, for example, the use of DSRC emergency messages using WAVE Short Message Protocol (WSMP) (e.g., IEEE std 1609.3), and/or specific communication channel configuration characteristics. In addition, a new service may specify the configuration for a specific communication technology. Such configuration parameters/information/characteristics may include, by way of example and not limitation (in the case of DSRC), an operating channel (e.g., channel 180), a maximum transmission power (e.g., 23 dBm), a data rate (e.g., a relative data rate of 9 Mbps). Additional examples of configuration parameters/information/characteristics for DSRC may be found in, for example, IEEE std 1609.4. Configuration parameters/information/characteristics for other communication technologies such as, for example, Wi-Fi (e.g., IEEE 802.11a/b/g/n/ac/af) may also include a specification of radio frequency channel, as well of security methods (e.g., WEP, WPA, WPA2, etc.) There are many ways for specifying the type of communication connection a specific service (511, 512, 513) needs.

In accordance with aspects of the present disclosure, various types of communication connections may include, for example, a delay tolerant connection where, for example, the service 511, 512, 513 wanting to use the network is able to wait until a suitable communication is available (e.g., when a stable connection is available, or when network congestion is at a minimum) at some point in the future. This may be possible because the data to be transferred has already been generated and stored at the AV, and may be transferred later when availability of a suitable communication connection with acceptable communication conditions has been verified and signaled by the connection manager block 506. Example systems and method aspects for delay tolerant network may, for example, be found in U.S. patent application Ser. No. 15/353,966, filed Nov. 17, 2016, and titled "Systems and Methods for Delay Tolerant Networking in a Network of Moving Things, for Example Including a Network of Autonomous Vehicles," the entire contents of which is hereby incorporated herein by reference.

In accordance with aspects of the present disclosure, the various types of communication connections may also include, for example, a connection that provides immediate access. This may be employed where, for example, a specific service (e.g., Service 1 511, Service 2 512, Service n 513) wants a communication connection to a destination, no matter what type of communication technology will be used by the connection manager. This may also be referred to herein as a "don't care" connection, in that the nature of the data to be communicated is such that the service requesting the communication connection doesn't care about the characteristics (e.g., cost, capacity) of the connection. For example, a service that monitors the Cloud for new configuration updates or software updates might not be concerned about the type of communication technology used for performing such a monitoring action. Such a monitoring action by an AV might not be delay tolerant, in that the service may require an immediate answer.

In accordance with aspects of the present disclosure, the various types of communication connections may include, for example, a need for "strict immediate access" in which the Service 1 511, Service 2 512, and/or Service n 513 that requests that the communication connect satisfy a number of strict demands regarding a communication connection. Some examples of such demands may include, by way of example and not limitation, the use of a specific communication technology, or a communication technology that meets some or all of the requirements discussed herein. Such demands may then be passed to the connection manager block 506 that, among other responsibilities, may identify an available communication connection that fulfills all of the requirements of the requesting service. One example of a service that may have a need for "strict immediate access" may be an "emergency" service that requires a stable communication connection, with low latency/delay, but does not require a communication path having high throughput/bandwidth. Another example of a service that may have a need for "strict immediate access" is a service that has need for access to the Internet, having a goal of a certain limit (i.e., depending on the profile for the service) for a maximum delay/latency and a reasonable throughput, so that end-users have a good QoE.

There are other additional types of demands that a service may pass to the service manager block 507 within the profile for the service (e.g., service profiles 508, 509, 510) including, for example, service priority, communication protocol type (e.g., WSMP, IP, all), security (e.g., none, Wireless Equivalent Privacy (WEP), Wi-Fi Protected Access (WPA), WPA2, IPsec, etc.), target identifier (e.g., media access control (MAC) address), location related inputs (e.g., a specific range of distance, a geo-fence that defines regions in which to allow or disallow wireless communication, etc.), wireless communication technology (e.g., one or more of, or all of DSRC, wireless cellular service (e.g., CDMA, TDMA, UMTS, GSM, "3G," "4G," LTE, "5G"), Bluetooth, and/or Wi-Fi (IEEE 802.11a/b/g/n/ac/ad), and/or response time (e.g., an amount of time to be permitted with a connection (e.g., a request expiry time)).

A service manager of each AV, such as the service manager block 507 of FIG. 5, may share the global context of an AV at a particular point in time. An AV global context may include what may be referred to herein as an AV context mode and an AV context state. An AV context mode may include, for example, transportation mode (e.g., when the AV is transporting people and/or goods), charging mode (e.g., when the AV is stopped and is in the process of charging the batteries of the AV), parked mode (e.g., when the AV is stationary in a parking location, waiting on a new job or activity), moving mode (e.g., the AV just finished its most recent job/activity and does not yet have a new job/activity, so the AV will seek a parking location and/or the AV is approaching the starting point for new job/activity (e.g., picking up something and/or someone)), and offline/idle mode (e.g., not in any other mode). An AV context state may include, for example, a context state in which the AV acts as an Internet service provider (i.e., "Internet"), a context state in which the AV performs sensor data acquisition (i.e., "data sensing"), a context state in which the AV acts as a "middle node" (e.g., extending connectivity to others by routing data), and a context state in which the AV is handling an emergency (i.e., "emergency").

In accordance with aspects of the present disclosure, a service manager of each AV system, such as the example service manager block 507 of FIG. 5, may use information shared by each neighbor node to decide how to take advantage of each one of them at a certain moment in time. The context monitor block 521 of FIG. 5 is a sub-block of the service manager block 507, and may, in accordance with some aspects of the disclosure, handle some or all of the AV context input coming from the network and from a feedback service 518 of FIG. 5, thus allowing the AV to then control its context mode and context state, as discussed herein. The following is an example of how an AV in accordance with the present disclosure may handle the information coming from local neighbors (e.g., neighbor AVs, neighbor nodes in general, etc.).

In such a scenario, a first service manager (e.g., service manager block 507) of a first AV may be requested to provide Internet access, and may receive information from a context monitor of two neighbor AVs, where the first neighbor AV is parked as a "middle node," and the second neighbor AV is transporting people while providing Internet access. The context monitor (e.g., context monitor block 521) of the first neighbor AV may act by signaling to the first AV that the service manager (e.g., service manager 507) should ask the connection manager (e.g., connection manager block 506) of the first AV to select the first neighbor AV as its next hop, since the first neighbor AV has a greater probability of getting a good backhaul connection to the Internet. Besides local information, the feedback service (e.g., feedback service block 518) may, for example, also receive a request from the operator/owner of the first AV and the first and second neighbor AVs (e.g., a fleet owner), requesting that the first AV change its context mode to "charging mode." Upon reception of such request, the feedback service (e.g., feedback service block 518) of the first AV may notify the context monitor (e.g., context monitor block 521) of the first AV, acting accordingly.

As discussed herein, the term "service" may be used to refer to an entity that is willing to use the AV system in order to send data throughout the network that connects AVs. In accordance with various aspects of the present disclosure, each service (e.g., Service 1 511, Service 2 512, Service n 513 of FIG. 5) may have a corresponding service profile (e.g., profiles 508, 509, 510, respectively) that may comprise a number of metadata items/elements that identify/describe the service. One or more example metadata items/elements have already been discussed herein, for example, the "service type." The profile for a service may also, for example, include a metadata item/element that identifies the "protocol type" to be used during communication, which may limit the communication technology or the number of communication channels available. WSMP and IP are examples of protocols that have restrictions for some standards. For example, WSMP may only be transmitted in its pure form via a DSRC wireless link. Therefore, a service attempting to send a WSMP message when no DSRC link is available may find that the WSMP message is dropped or is encapsulated in IP frames. In the case of such encapsulation, the connection manager (e.g., connection manager block 506) may be forced to establish a tunnel for WSMP-IP transfer between the current network node (e.g., AV) and the target network node. In such a situation, the identity of the target node may also be one metadata item/element in the service profile, so the service manager may pass that information to the connection manager as part of the request. IP frames may be transmitted via DSRC with some restrictions, which may vary depending on the regulations of each country. For example, all current standards for DSRC (e.g., 5.9 GHz-IEEE-802.11, IEEE std 1609.x, and the European Telecommunication Standards Institute (ETSI)) prohibit the use of IP frames on the control channel. So, for a system where DSRC is only available on the control channel, it may be necessary to send IP frames over other technologies, such as cellular, being that DSRC is not available.

Another example metadata item/element that may be required to be present in the service profile is "service priority." A service manager may use the service priority to set/adjust the bandwidth available for a specific service, depending on the implementation. For example, a high-priority service may get full channel bandwidth, while a lower priority service may share channel bandwidth with another lower priority service. Additional information about what is referred to as "alternate channel access" may be found in, for example, IEEE std 1609.4. As discussed herein, an "emergency" service may be handled with the highest priority compared, for example, to a "data logging" service. For a service having a service priority of "emergency", the service manager may make sure that no other service is going to interfere with it, being that the "emergency" service has the highest priority. For example, any service using the system for low latency communication may be shut off so that the emergency service may use the system at its full performance. Even though service priority may be processed as a strong input to the service manager, a service with a relatively lower service priority may ultimately be prioritized higher than a service having a relatively higher service priority, for example if the service manager (e.g., service manager block 507) concludes there are currently no conditions that enable the relatively higher priority service to run. For example, a service that offers Wi-Fi, in-vehicle access to an Internet connection may be idle, if no end-users are currently detected as accessing that service. In this case, the relatively higher priority service may acquire a communication channel as soon as an end-user registers (e.g., finishes authentication) itself on the Wi-Fi side.

The feedback block 518 of FIG. 5 represents functionality that may be viewed as a "special" service (e.g., feedback block 518 may be considered to be "service 0") that gathers feedback 521, 522, 523 from local services 511, 512, 513, and may manage a local data source 519 (e.g., a sensor device such as GNSS/GPS) that feeds the service manager 507 with information that may be used for deciding, in close proximity to the connection manager block 506, which communication connection may be a better choice for a specific service of the AV. The feedback block 518 may, for example, have its own service profile, and may communicate via a communication link 520 with the Cloud 517, to gather remotely located historical information stored on a data base at the Cloud 517. Such information may then be fed to the service manager block 507 as input 519. An example of such a local data source being employed with remotely accessible historical information is the use of local GNSS/GPS information coming from a local service (e.g., a GNSS/GPS receiver of an AV) being used together with remotely located, historical information (e.g., at Cloud 517), from which a probability of a successful wireless connection of a network node (e.g., the AV) to a fixed AP (not shown) at or near a specific geographic location/area, may be derived. Using such information, the service manager block 507 may decide whether or not to request the connection manager 506 to "blacklist" the fixed AP.

It should be noted that the discussion herein is provided as an example of the use of a service profile, and is not intended to be limiting in any way, as many other, different examples fall within the scope of the present disclosure.

Figure 6:
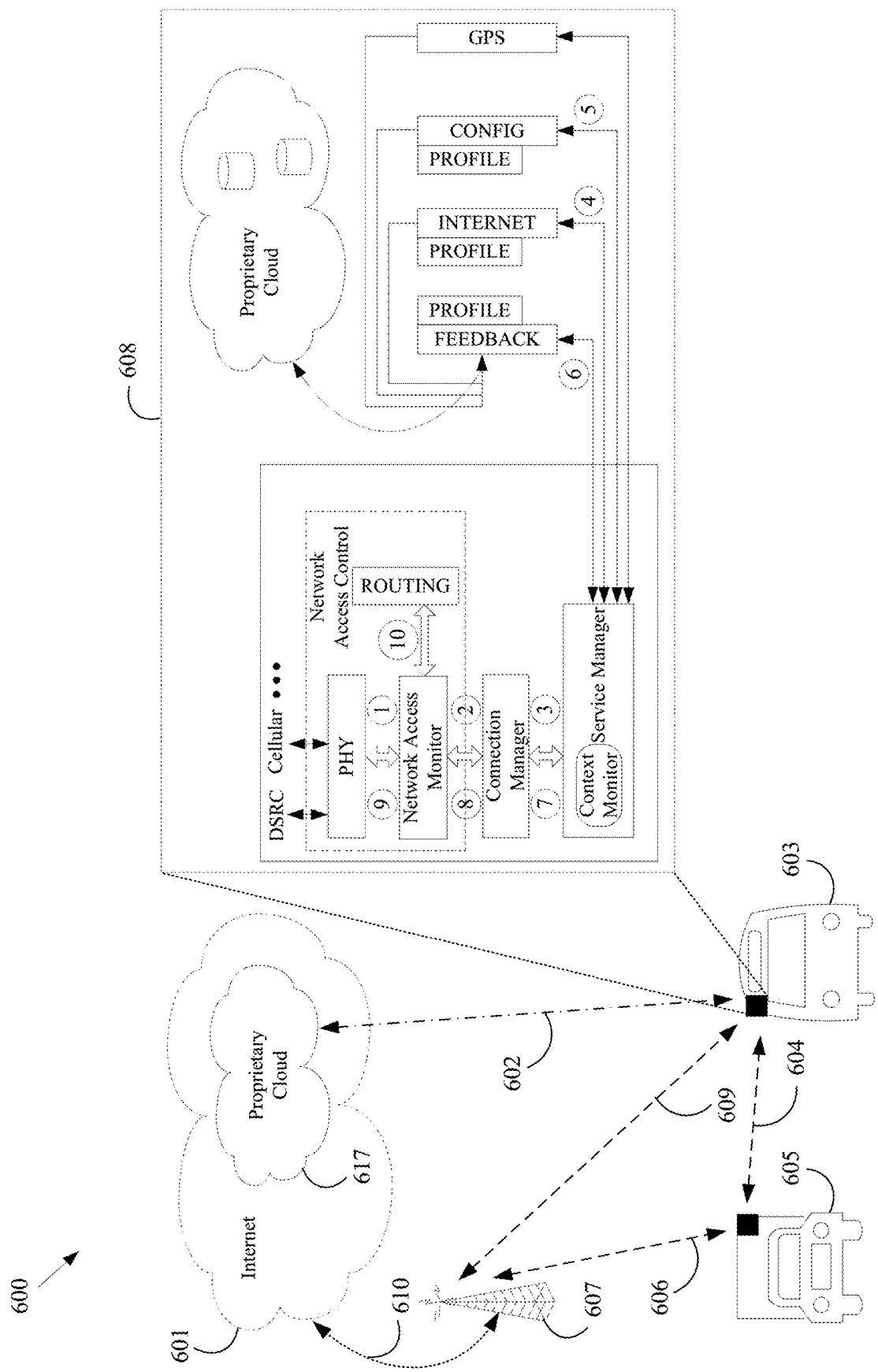
FIG. 6 is a block diagram illustrating how the functional blocks of an AV system interact with one another during an example flow of information involving an AV system of an autonomous vehicle, a neighbor autonomous vehicle, a fixed access point, and a Cloud accessible via the Internet, in accordance with various aspects of the present disclosure.

FIG. 6 is a block diagram illustrating how the functional blocks of an AV system interact with one another during an example flow of information involving an AV system 608 of an autonomous vehicle 603, a neighbor autonomous vehicle 605, a fixed access point 607, and a Cloud 617 accessible via the Internet 601, in accordance with various aspects of the present disclosure. The functional blocks of the AV system 608 of FIG. 6 may correspond to, for example, similarly named functional blocks of the AV system 500 of FIG. 5, described in detail herein. The example system or network 600 may, for example, share any or all characteristics with the other example methods, systems, networks and/or network components 100, 200, 300, 400, and 500, discussed herein.

The illustration of FIG. 6 shows a first network node, the AV system of the AV 603, communicatively coupled via a DSRC link 604 to a second network node, the AV system of AV 605, which is communicatively coupled via a DSRC link 606 to a third network node, fixed AP 607. The fixed AP 607, as shown in FIG. 6, is communicatively coupled to the Internet 601 via an Ethernet connection 610. As also shown in FIG. 6, the AV systems of the AVs 603, 605 may detect one another as neighbors using the DSRC links 604, 606, 609. The numbers within the ten numbered circles in the illustration of the AV system 608 of FIG. 6 represent the order of an example sequence of actions/steps performed by the functional blocks of the AV system 608, as described in further detail, below.

At action/step 1, the physical layer interface (PHY) block of the AV system 608 may provide information about any wireless networks that the PHY has detected to the network access monitor block, thereby making the network access monitor block aware of the neighbor AV 605, the fixed AP 607, and the characteristics/conditions of the corresponding wireless (e.g., DSRC) links 604, 609. Such characteristics/conditions may include, for example, information about message/packet latency/delay to the Internet through both of wireless links 604, 609, throughput/bandwidth available via the wireless links 604, 609 to both of the neighbor AV 605 and the fixed AP 607, and the maximum communication range determined by the communication technology. The PHY block may also report to the network access monitor block that a cellular network connection 602 is available, and that, for example, the cellular network connection 602 has a relatively higher latency and a relative lower throughput than the DSRC wireless links 604, 609.

Next, at action/step 2, the network access monitor block may report to the connection manager block of the AV system 608 that Internet access is available via DSRC wireless links 604, 609 via two different neighbor nodes (i.e., neighbor AV 605 and fixed AP 607), and that a cellular connection is available.

Then, at action/step 3, the connection manager may signal the service manager of the AV system 608, indicating that a connection to the Internet is possible, both through DSRC wireless links (e.g., wireless links 604, 609) and a cellular network (e.g., cellular network 602).

At action/step 4, a service block that is configured and able to provide Internet access to Wi-Fi end-users inside the AV 603 ("INTERNET") may request use of a suitable communication connection by passing the service profile of the "INTERNET" service, to the service manager block of the AV system 608. The service profile of the "INTERNET" service may include, for example, metadata items/elements representing values for the maximum acceptable communication link latency/delay and the minimum acceptable communication link throughput/bandwidth, and may include, for example, metadata items/elements indicating a service type of "strict immediate access" and a service priority of "high."

At action/step 5 of the example, another service block ("CONFIG") may, at or about the same time as action/step 4, attempt to communicate with a resource located in the Cloud 617, in order to check whether a new configuration update is available for the AV system 608. The "CONFIG" service block may send a request to the service manager block of the AV system 608, requesting a communication connection, and may pass the service profile of the "CONFIG" service block to the service manager block. The service profile sent by the "CONFIG" service block may, for example, include metadata items/elements indicating that the service type of the "CONFIG" service block is "don't care" immediate access, and that the service priority is "low."

Next, at action/step 6, the feedback service block ("FEEDBACK") of the AV system 608 may receive historical data from, for example, the Cloud 617. The received historical data may, for example, indicate that the quality of wireless communication between a network node (e.g., AV system 608 that resides in AV 603) and the fixed AP 607 of FIG. 6 is typically degraded in the specific geographic area at which the AV 603 (in which AV system 608 is installed) is currently located. In accordance with various aspects of the present disclosure, the feedback service block of AV 608 may, for example, confirm the indications of the historical data upon detecting loss/degradation of wireless communication with fixed AP 607 using, for example, location information received from a GNSS/GPS service ("GPS") block. The feedback service block may, for example, pass such information to the service manager block of AV system 608.

At action/step 7, the service manager block may request the connection manager block to ignore (e.g., "blacklist") the fixed AP 607, and may establish a connection for the highest priority service, the Internet provider service block "INTERNET", through wireless link 604 to the network node located in neighbor AV 605.

Next, at action/step 8, the connection manager block of AV system 608 may request the network access monitor block to perform a channel configuration, in order to match the communication link conditions of the AV system 608 to those of the AV system of AV 605.

At action/step 9, the network access manager block of AV system 608 may translate the request from the connection manager block to perform a channel configuration, into the application of channel configurations to the DSRC communication technology, by requesting the PHY block of the AV system 608 to establish a wireless connection between the network node (e.g., the AV system 608) of AV 603 and the network node 605 (e.g., the AV system of the AV 605).

At action/step 10, the network access monitor block of the AV system 608 may request the routing block to route the data traffic generated/coming from the "INTERNET" service block to the Internet via the neighboring AV 605, since the neighbor AV 605 because the AV 605 has been advertising to other AVs/network nodes that the AV 605 is providing access to the Internet. Along with a physical channel configuration (e.g., a configuration of a communication technology) that an AV (e.g., AV 605) is using, the AV may report the IP configuration that is to be used for routing purposes over the network. Additional details may be found, for example, in IEEE std 1609.3. Such information may either be part of a WAVE Service Advertisement (WSA) "routing part", or another, possibly "vendor-specific frame" that comprises IP information needed for other network entities to connect/route their data traffic through the neighboring AV network node that is advertising Internet access.

In accordance with various aspects of the present disclosure, all functional blocks of the above sequence of actions/steps may signal an acknowledgement back to the previous block in the sequence (i.e., "up the chain"), upon success or error in performing the indicated action/step, including signaling by the service manager block to each affected service block. Such signaling may be used to indicate whether the connection has or has not been successfully established, and whether communication according to a particular response time, has or has not been established.

In accordance with aspects of the present disclosure, once a communication connection request for the currently highest priority service (e.g., in this example, "INTERNET") has been completed, the service manager block may then select a pending communication connection request for a service having a service priority that is the next service priority lower than that of the service for which a communication connection was just established (i.e., the next-highest priority service). In the current example, the establishment of a communication connection for the configuration update service ("CONFIG") would be the next request processed after the request for connection of the highest priority service (i.e., "INTERNET"). In processing that connection request, the service manager of an AV system (e.g., AV system 608), when performing actions/steps 7, 8, 9, and 10 may request that lower blocks in the chain of functional blocks (e.g., the connection manager block, network access monitor block, routing block, and PHY block) connect and route the data traffic coming from the configuration update service block ("CONFIG") to a cellular network connection, and to not disturb the established (e.g., DSRC) communication connection of the higher priority service ("INTERNET"). Note that the example just presented is only one example of updating, which may be performed in any of a variety of manners. For example, additional examples of systems and method for performing software and/or configuration updating are provided in U.S. patent application Ser. No. 15/157,887, filed on May 18, 2016, and titled "Systems and Methods for Remote Software Update and Distribution in a Network of Moving Things;" U.S. patent application Ser. No. 15/138,370, filed on Apr. 26, 2016, and titled, "Systems and Methods for Remote Configuration Update and Distribution in a Network of Moving Things;" U.S. Provisional Patent Application Ser. No. 62/378,269, filed Aug. 23, 2016, and titled "Systems and Methods for Flexible Software Update in a Network of Moving Things;" and U.S. Provisional Patent Application Ser. No. 62/376,955, filed Aug. 19, 2016, and titled "Systems and Methods for Reliable Software Update in a Network of Moving Things;" the entire contents of each of which are hereby incorporated herein by reference.

Generally, a fleet of AVs will consume and/or generate huge amounts of data for their normal operations, including for software, maps, internal services/applications, etc. The data can be generated by the many sensors on board an AV and also received from other sources spread around the routes the AVs may travel. The other sources may be, for example, other AVs and/or sensors that are part of the various infrastructures (e.g., tools, traffic lights, cameras, etc.) on the routes that the AVs travel. These data may influence the operation mode of the AVs. For example, aside from any data that may be transmitted to an AV for its operation, commands may also be given to an AV to pick up and drop off people, to go to a parking spot, to go to a charging station, etc.

An operational AV may need to request data from the Cloud and/or transmit to the Cloud. The Cloud may be understood to comprise one or more servers, and, hence, a server may be referred as a cloud server. This type of data may be, for example, data regarding the route that the AV is taking so that the AV can modify its route if it needs to due to traffic, accidents, etc. An AV may also transmit/receive data to or from other AVs nearby or the infrastructure so that it can update its data with information that its sensors cannot acquire directly. An AV may also acquire data with its sensors for use in the AV. This type of data may be specific to an AV, and may be data such as, for example, performance characteristics of the AV, control information for the AV, etc. While other entities may also be interested in this type of local data, generally these types of local data may not be the type of data that is useful to other AVs. These types of data may be used by, for example, a fleet manager and/or a factory to keep track of performance for the AVs, and possibly to determine whether a device is degrading and needs to be replaced or recalibrated. These types of information may then also be used to try to improve the devices.

Some local data may also be relayed to other nearby vehicles, whether AVs or driving assisted vehicles. For example, local data may indicate that one or more of a specific vehicle's steering control, electrical subsystem, braking system, drive train, etc., may be failing or is degraded. That data may be used by other surrounding vehicles to give more leeway than normal to allow additional maneuvering/stopping room in the event that the vehicle may make an unexpected maneuver such as, for example, performs hard braking without notice, is not able to stop within an expected distance, performs sudden swerving without notice, etc. Accordingly, it can be seen that data transfer may be performed by AVs as well as other vehicles that are able to process the local data. However, for the sake of brevity, the disclosure will generically use AVs for vehicles with the understanding that the disclosures presented are not limited strictly to AVs.

It can be seen that AVs may need to coordinate with other entities directly or through the Cloud, so that they can establish local and/or global optimizations in the way the many types of data are communicated between AVs and the Cloud via various networks such as, for example, cellular networks, microwave networks, Wi-Fi networks, and other types of wireless networks.

As the amount of data carried or required by a multitude of AVs can be very large, rules and policies may be needed to prioritize the data that needs to be communicated from one entity to another (e.g., between AV and the Cloud, between AV and the Infrastructure, between AV and AV, etc.), to balance data transportation resources among the AVs, to decide which data should be sent first, to decide which data can wait to be sent in a delay tolerant fashion, to decide which offloading opportunities to use to transfer/receive data to/from the Cloud, etc. These rules or policies can lead to the local synchronization of AVs with other AVs nearby or with the Cloud for a general synchronization with the entire fleet.

Figure 7:
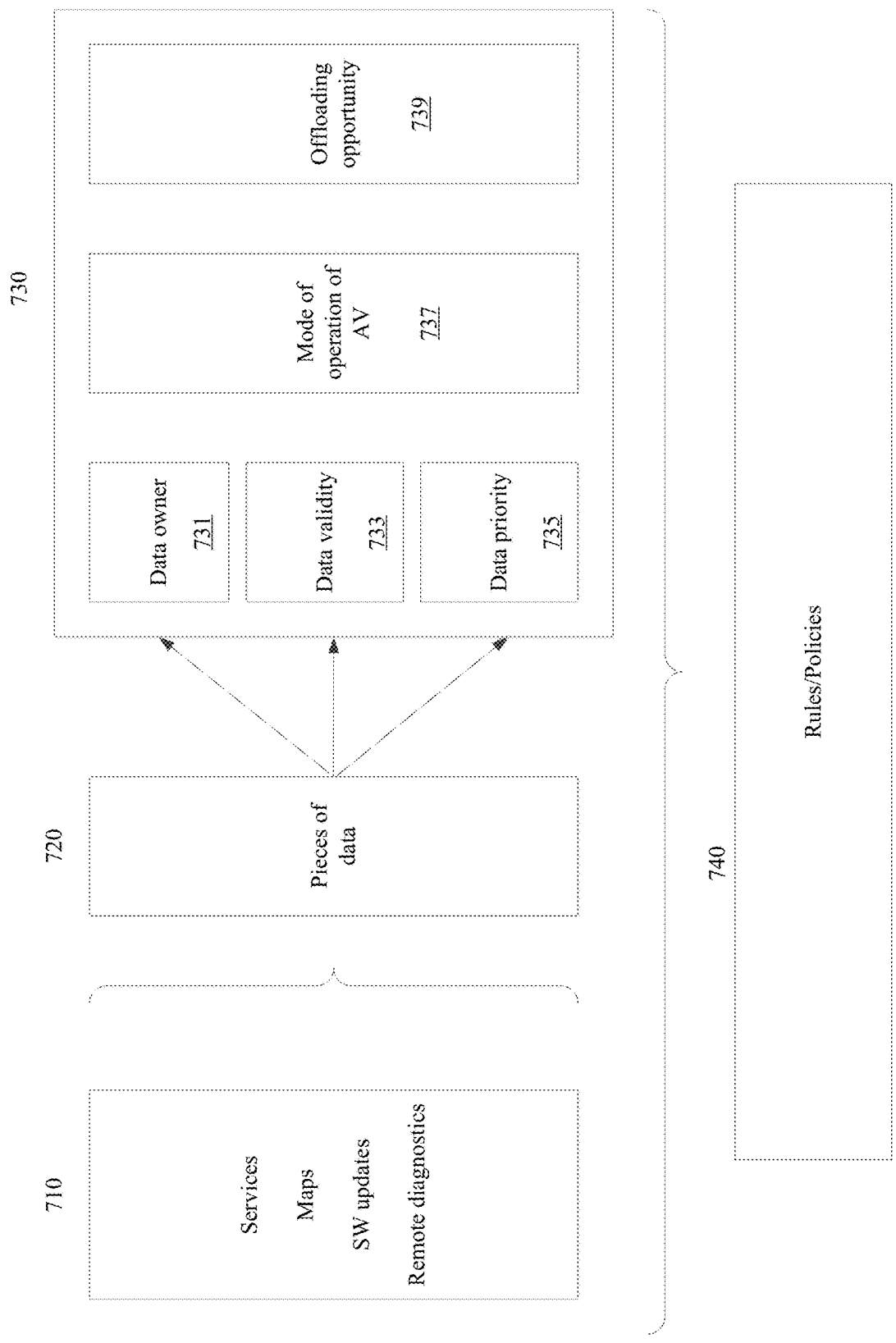
FIG. 7 is a diagram illustrating examples of variables involved in communicating data, in accordance with various aspects of this disclosure.

FIG. 7 is a diagram illustrating examples of variables involved in communicating data, in accordance with various aspects of this disclosure. Referring to FIG. 7, various AVs may need to prioritize the transmission of several flows of data or types of messages, as shown in block 710, based on the context of the AVs, modes the AVs are operating in, or services running on top of them, as discussed in previous paragraphs. This may involve collaboration and negotiation among nearby AVs to agree on policies/thresholds that may define when (for example, via a timestamp) and how each type of data should be sent to the Cloud (e.g., in real-time or via a delay tolerant network), or if the data should be kept locally, cached, shared, or dropped, based on the needs of services/applications or the actions that AVs need to perform. A group of AVs near each other may self-organize to select the AV that will transfer a specific type of data/content or perform the transmission of a specific message or content (e.g., which AV may ask the Cloud for certain content and will broadcast that content to other AVs in its group, etc.).

The data that needs to be communicated among the AVs, the infrastructure, and the Cloud may be shown in the block 720 as pieces of data. This data may be communicated to various AVs 730. Within a specific AV 730, the pieces of data may be associated with one or more of various categories. In some cases, a specific AV 730 may be designated as a data owner for a group of nearby AVs. The data owner may be responsible, for example, for communicating with other sources of information such as, for example, the Cloud (e.g., server(s)). By selecting a single AV to act as a data owner, the amount of communication, and the cost, between the group of AVs and the Cloud may be reduced. For example, when an update is provided for all AVs, the update may only need to be sent to the data owner, and each data owner may then relay the updates to the other AVs in its group.

When uploading the data to the Cloud, the various AVs in a group may have different connection to, for example, the Cloud. Some AVs may have a weak connection, some AVs may have a relatively cheap connection, etc. The various AVs may provide to the data owner the different data that needs to be uploaded. The data owner may use the policies/rules agreed upon by the AVs in the group to prioritize uploading the various data. When selecting a data owner, the group may select an AV to optimize upload cost and download cost. In other cases, there may be a one data owner for upload and another data owner for download.

Data may also be categorized by its validity 733. For example, a piece of data may be valid for a specific period of time. An example is if a car accident is reported, then the various AVs 730 and/or the Cloud may assume that the accident, and, hence, any traffic congestion due to the accident, may be a temporary incident. When a report is received that the accident site has been cleared, the data associated with the accident report may be flagged as being invalid. Another example may be construction on a stretch of highway and the period during when the construction will take place, as well as hours of construction during any particular day.

Another example category may be a priority 735 associated with a piece of data. An accident report may be considered a high priority and may be reported to the Cloud and/or other AVs 730 as soon as possible. A routine report, however, by an AV 730 regarding its normal status (e.g., fuel/battery level, speed, location, etc.) to fleet headquarters may not need to be made immediately. Accordingly, the AV 730 may make a report when it can access a network at low-cost or for free.

An AV 730 may also take into account its mode of operation 737. For example, if the AV 730 is parked or at a charging station, then uploading and/or downloading map-related information may not be highly prioritized. When an AV 730 is parked, an AV may prioritize software updates or remote diagnostics as the connectivity can be more stable and, therefore, less prone to errors or failures than when the AV 730 is moving. The speed of travel of the AV 730 may also be taken into account, as well as amount of traffic (both vehicle and data network), the number of network access points (MAPs, FAPs, cellular connections, etc.) in the region of travel, and the cost of accessing the network via these network points.

The AV 730 may also take into account some or all of these variables including offloading opportunities 739. The offloading may occur to nearby AVs that may be traveling in a director where if may be cheaper to upload data, or from nearby AVs that may have information that the AV 730 is seeking.

AVs may also sense and use opportunistic, low-latency or high-throughput modes of communication (e.g., Gbit links, APs) to upload/download the massive amount of data to/from the Cloud. An AV may leverage its look-ahead context information for nearby APs or upcoming APs to be used for uploading/downloading data. Some or all of this information may also be shared with other nearby AVs so that each AV may be able to prioritize the applications/services/data that can take advantage of those communication links on-demand.

At least these variables may be taken into account to formulate rules/policies 740 for use by the various AVs and/or the Cloud. Accordingly, it can be seen that challenges to managing the huge amounts of data the AVs generate and/or receive, as well as providing for the different requirements for data access such as, for example, latency, amount of data, and throughput by the internal or external applications and services, may be simplified by rules/policies 740.

As discussed above, the AVs 730 may need to prioritize the types of data to upload/download based on different levels of context and collaborate with nearby AVs to meet the latency requirements for the data. Rules/policies may also be put in place to determine which data will be transported by the AV 730 and which data will be offloaded to nearby AVs. Thus, each AV 730 may continuously learn along its path and control the opportunities to download and/or upload data cost effectively while on the move. All of these decisions may need to be taken into account for any networking or communication infrastructure built for AVs or on top of AVs to optimize the transport of data locally in the AV, with the AV and its neighbors, and/or with the AV and Cloud.

While it was described as a group of AVs determining the rules/policies to use, various embodiments may have an initial set of rule/policies that may be promulgated by, for example, the Cloud. The groups of AVs may then use the initial set of rules/policies, or amend them based on input from the different AVs in a group. For example, one AV may expect to generate much more data than average, but that data may be, for the most part, delay tolerant. The specific manner of amending/generating the rules/policies by a group of AVs may be design and/or implementation dependent.

Figure 8:
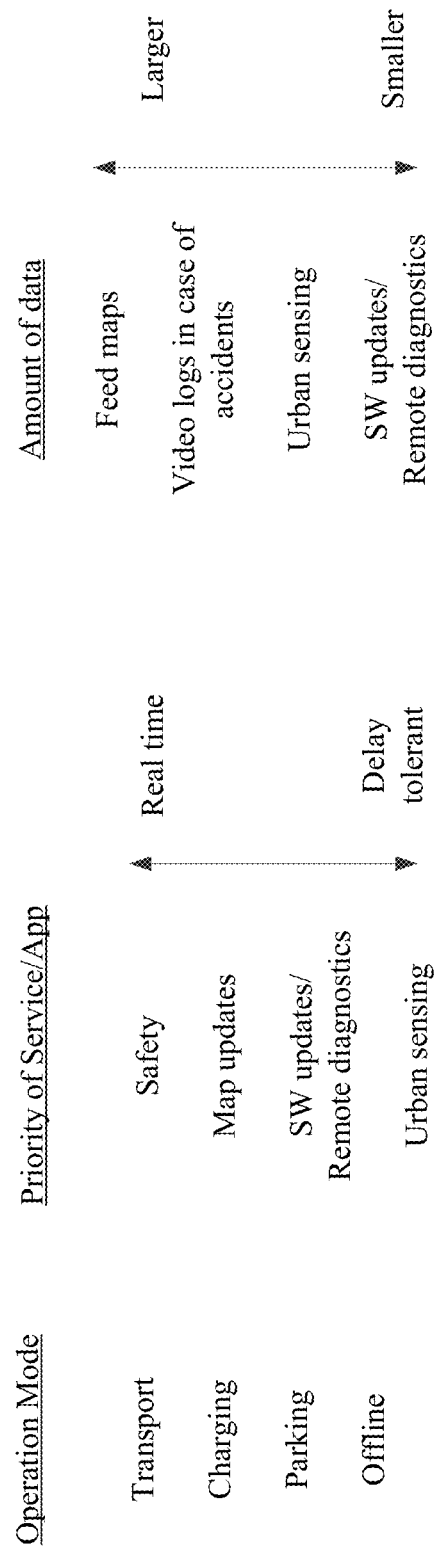
FIG. 8 is a diagram illustrating examples of variables in prioritizing data to be communicated, in accordance with various aspects of this disclosure.

FIG. 8 is a diagram illustrating examples of variables in prioritizing data to be communicated, in accordance with various aspects of this disclosure. For example, AVs may take into consideration their operation mode to prioritize the data. As an example, if an AV is parked or at a charging station, then uploading and/or downloading map-related information may not be highly prioritized. When an AV is parked, an AV may prioritize software updates or remote diagnostics as the connectivity can be more stable and, therefore, less prone to errors or failures than when the AV is moving.

Real-time communication may be desirable for some applications and services. For example, safety related applications and advisories, software or hardware logs related to updates, and/or real-time map updates in case of sudden changes of traffic/infrastructure conditions may be given higher priority, and therefore, transmitted or received in real-time. Other types of data such as urban sensing data for deep city learning may be able to tolerate some delays, so they may have lower priority and sent periodically using, for example, a delay tolerant network.

Some applications that run on an AV may require more time slots to send/receive data due to the amount of data generated or required. For example, logs of data for the route the AV followed may be used to improve city maps and/or for insurance purposes. There may also be video streams in case of accidents or for information purposes. The video stream of the accident may be used, for example, by police departments and other emergency responders to determine whether a response is needed by that particular department. The various responders may also be able to prioritize their own responses based on what the video steam shows, as well as emergency calls regarding the accident. Accordingly, the video log may need to be detailed in some cases, and not so detailed in other cases. The level of detail may be requested, for example, by third parties such as emergency responders.

Therefore, depending on the operation mode of an AV, the priority of the data at issue and the amount of data at issue may be taken into account to determine which pieces of data may need to be transmitted when. The amount of data may also be factored into determining the priority of the data.

Figure 9:
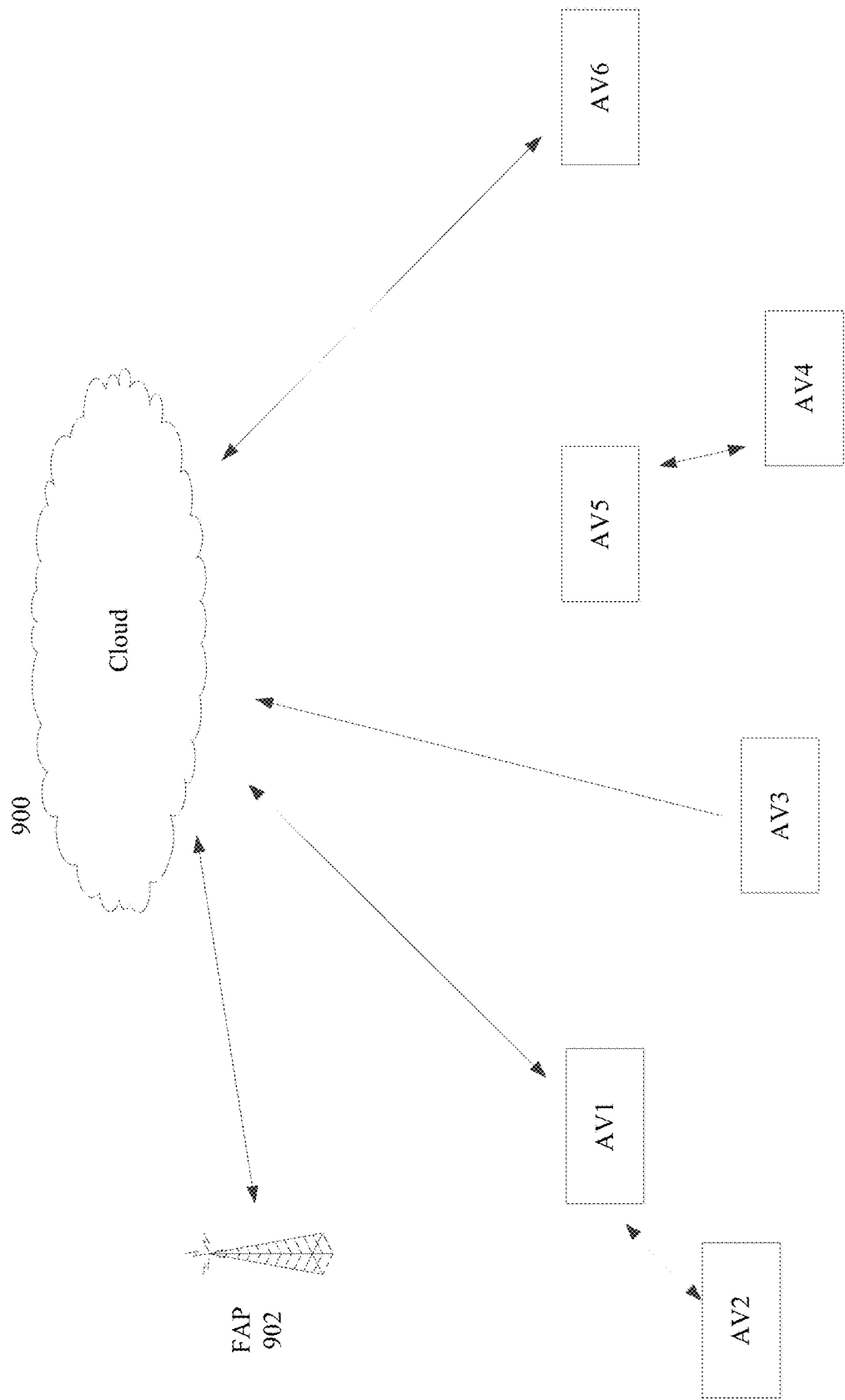
FIG. 9 illustrates various example communication scenarios for autonomous vehicles, in accordance with various aspects of this disclosure.

FIG. 9 illustrates various example communication scenarios for autonomous vehicles, in accordance with various aspects of this disclosure. One example may be for the AVs to collaborate with other nearby AVs to make sure the latency requirements of the data that need to be transported from/to each AV are met. If the data has very strict latency requirements, then the data may be sent in real-time or near-real-time according to the associated priority for the data. However, when the data is delay tolerant, the AV may wait to send the data until it is connected through low-cost access points such as, for example, Wi-Fi or DSRC. The cooperation among the AVs may also take advantage of opportunities to send the data quickly to the Cloud for the data that may have some expiry time or period of validity. In addition to transferring data more quickly, the cooperation among AVs may also help reduce extra storage costs that may occur at the AV level.

Referring to FIG. 9, in an example scenario, AV1 may receive information via the Cloud that indicates that a FAP is less than 1 minute away at the present rate of travel. The AV1 may share this information with a nearby AV2 since AV2 may also be traveling in the same direction at approximately the same speed. AV2 may in turn share with AV1 the information that a DTN will be available (or reached) in about 2 minutes. Accordingly, both AV1 and AV2 now have more information than before and may be able to plan data transfer better.

In another example scenario, AV3 may upload to the Cloud 900 various data it has gathered during its travel on its route. This may be done using, for example, the rules/policies discussed with respect to FIG. 7 and the prioritization discussed with respect to FIG. 8.

In another example scenario, AV4 may query AV5 whether there is any information that AV5 can share with AV4, or that AV5 needs to offload to AV4. Based on the context of travel and operation mode of AV5, and AV5's knowledge of the context of AV4's travel and operation mode (which AV4 transmitted to AV5), AV5 may reply whether there is information to be communicated to AV4.

In still another example scenario, AV6 may transmit information gathered during its travel so far to the Cloud 900, and may receive updated route information from the Cloud 900. The Cloud 900 may use the information transmitted by AV6 to update other AVs that have not yet traveled the portion of the route that AV6 has already traveled, and similarly, the update to AV6 from the Cloud 900 may be processed from information from other AVs that have already traveled the portions of the route that AV6 has not yet traveled. The AVs may also drop packets as they expire, or where the data is no longer valid. In addition to other case discussed for valid data, data may be deemed to be invalid when the information for the portion of its route that it has already traveled has already been transmitted to the Cloud 900.

Accordingly, in order to allow AVs to cooperate with each other, and with the use of the Cloud 900, the AVs may need to periodically share their positions and extra context with the Cloud 900 as well as with each other. The Cloud 900 may periodically notify the AVS about the FAPs the AVS may not be able to sense. The information about the FAPs may be available in terms of time and/or by geographical terms such as distance or location with respect to specific roads such as, for example, at the southeast corner of the intersection of Maple Road and Elm Street. When a first AV passes a second AV, the first AV may inform the second AV of FAPs that the second AV will soon come to, and vice versa. Furthermore, the first AV may ask the second AV if it has something to send that the first AV can send to the Cloud 900, or make a request to the second AV if the first AV has data it would like the second AV to send to the Cloud 900.

If an AV has delay tolerant data for the Cloud 900, it may share the data in part or in whole with other AVs for them to send at an opportune time. In some cases, if an AV is not able to send the delay tolerant data to the Cloud 900 through a low-cost connection, it may drop such data once the data is no longer relevant because it expired in time or geography.

Figure 10:
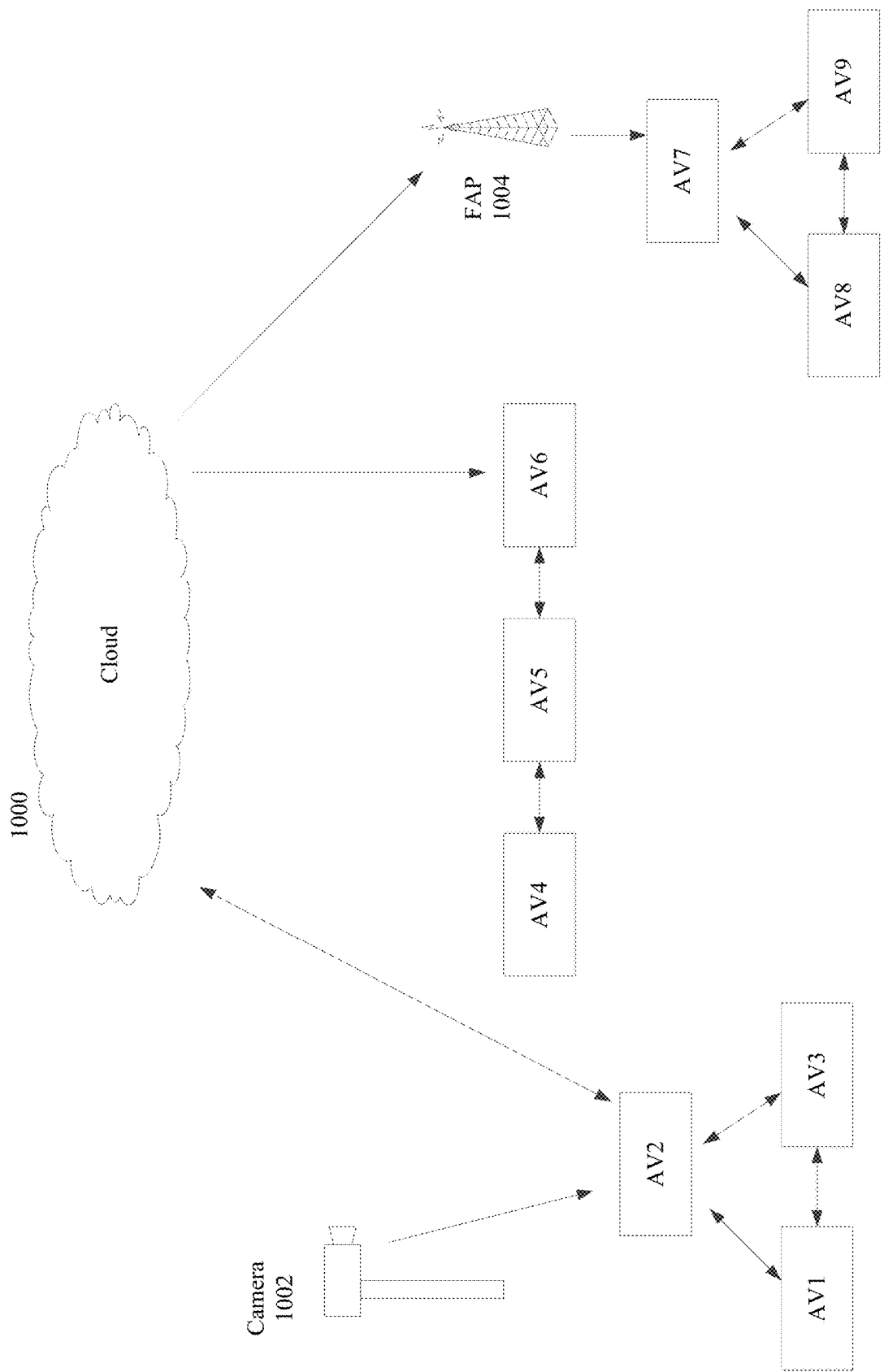
FIG. 10 is an illustration of example collaborations among autonomous vehicles to optimize data flow cost, in accordance with various aspects of this disclosure.

FIG. 10 is an illustration of example collaborations among autonomous vehicles to optimize data flow cost, in accordance with various aspects of this disclosure. In order to optimize the amount of data that flows in the network infrastructure that supports AVs, there may need to be optimization of determining which AV, at a specific location or road, or within a specific timeframe, may be responsible for communicating data with other entities in a network. This AV may be referred to as a data owner among a group of AVS near each other.

The data owner may, for example, gather the content that needs to be sent to, for example, the Cloud 1000, or receive content from, for example, the Cloud 1000 and then broadcast the content to nearby AVs that belong to its group. This may act to reduce the amount of data that is replicated in the network, as well as the total costs of all the AVs in communicating with, for example, the Cloud 1000.

Referring to FIG. 10, in an example scenario, one or more AVs may detect that there is some source of information (e.g., camera, sensor, road system, etc.) that has data to be sent to the Cloud 1000. For example, AV1, AV2, and AV3 may share information with each other relevant to deciding a data owner. The relevant information may be, for example, average speed of an AV, direction of travel of the AV, proximity of the AV to an access point, estimated time of connection to present access point for the AV, quality of communication with the present access point, and urgency of the AV in communicating data to the Cloud. The quality of communication may comprise various measurements such as, for example, latency, received signal strength indication (RSSI), bandwidth, etc.

An AV may be selected as the data owner when that AV is, for example, expected to spend more time connected to that source of information (e.g., the Cloud 1000), has the slowest average speed, or has more urgent requirement to have access to information from the Cloud 1000. Also, the AVs in a group may decide to load share by determining beforehand how long each AV should be assigned as a data owner, or how long an AV should be a data owner before a new data owner is selected.

In the AV group formed by AV1, AV2, and AV3, AV2 may be selected as the data owner for the data transmitted to the Cloud 1000. Accordingly, as shown in FIG. 10, the data owner (AV2) may receive video data from the camera 1002, and send the video data to the Cloud 1000. In some cases, AV1 and AV3, if they have access the video data, they may choose not to receive the video data since they have no responsibility for transmitting the video data. Depending on a particular protocol used by the group of AVs, there may be communication among the AVs to determine a proper course of action among the AVs in a group.

In some cases, the data owner (AV2) may determine that it can no longer be a data owner because, for example, it is moving out of range or because the cost of being a data owner has reached a limit. In such cases, the data owner (AV2) may notify the other AVs in its group and/or area that it will not be a data owner before disconnecting with a source of information, and a new data owner may be selected. Or, the present data owner (AV2) may assign a new data owner based on the context information that was available at the time the present data owner was selected, or the context information available at the present time.

When there is new content (software updates, MAP updates, etc.) to broadcast in the network, the Cloud 1000 may first advertise to all AVs in the fleet that a new update will be sent to the network in order to allow all AVs to be aware of the new content available. The AVs located near each other may then agree on the AV that will receive the new content from the Cloud 1000 to rebroadcast to others nearby. An AV may be selected as the data owner because it has the most stable connection and/or is close to a FAP. For example, AV6 may be a data owner because its connection to the Cloud 1000 is more stable than the connection for AV4 or AV5, or AV7 may be a data owner because it is closer to the FAP 1004 than AV8 or AV9.

Each AV may communicate to the Cloud 1000 whether it will receive the content directly from the Cloud 1000 or via another AV. The communication may be direct to the Cloud 1000, or via another AV as in the case of AV4 and AV5 in FIG. 10. In this way, the Cloud 1000 can keep track of responses from each AV so that all AVs in a fleet are accounted for, and the Cloud 1000 can establish connections with the data owners as needed. Additionally, if any AV that is expecting to receive the content from a data owner loses connection with the data owner, it may ask the Cloud 1000 for the content directly. Or the AV that lost connection may reconnect at a later time to the present data owner, or join another group, etc.

In an example scenario, a map update from the Cloud 1000 may be communicated to AV2, which may forward the map update to AV1 and AV3. Similarly, the map update may be communicated by the Cloud 1000 to AV7, which may then forward the map update to AV8 and AV9. The map update may also be communicated to AV6, which may communicate it to AV5, which may then communicate it to AV4. This serial communication may be useful, for example, when AV4 is able to communicate with AV5, but does not have reliable communication with AV6 or the Cloud 1000.

Accordingly, various embodiments of the disclosure are not limited to the example scenarios disclosed herein as there are many other scenarios for an AV to communicate with the Cloud 1000 within the scope of this disclosure.

Figure 11:
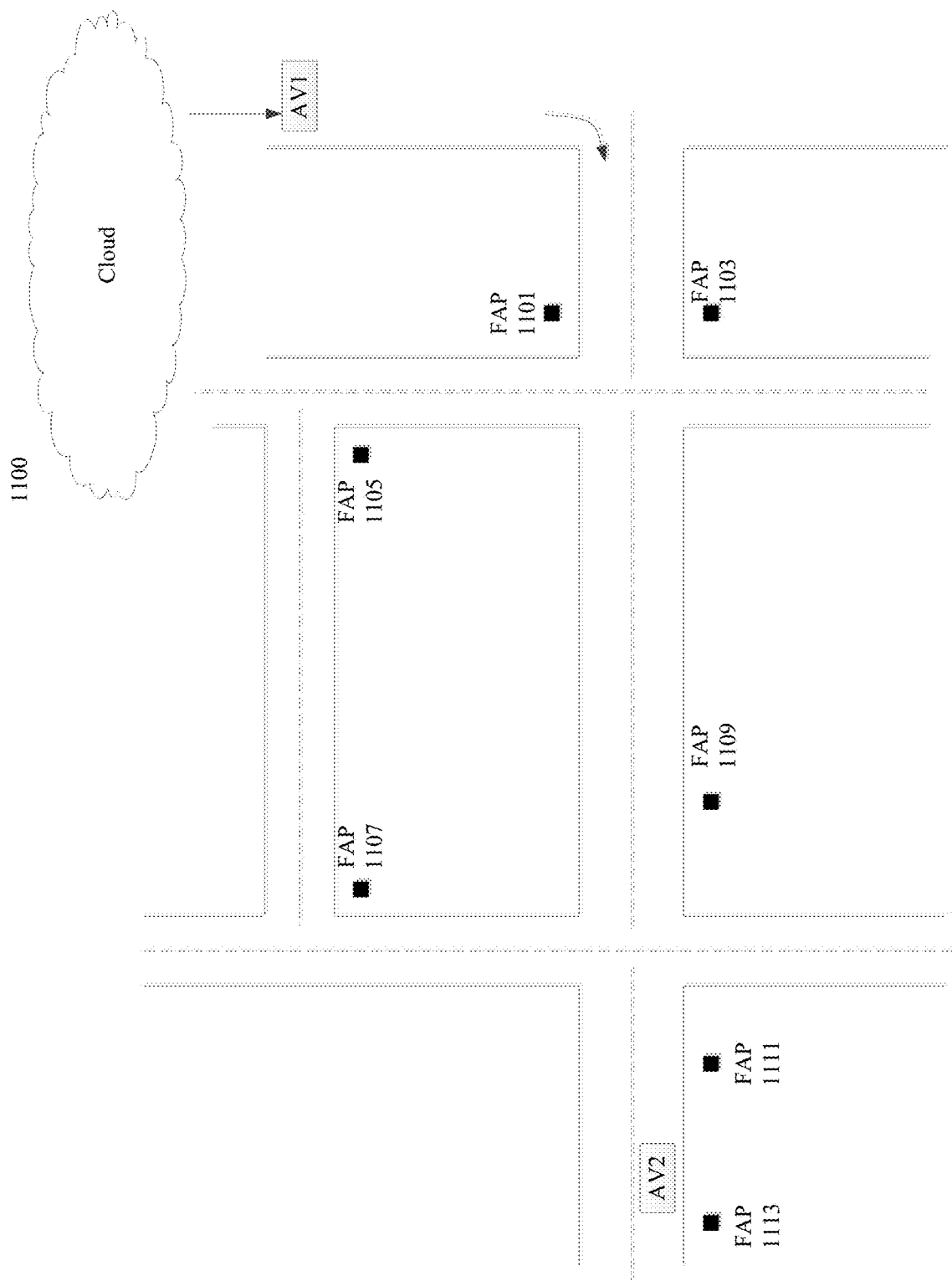
FIG. 11 is an example illustration of autonomous vehicles on their routes managing offloading opportunities, in accordance with various aspects of this disclosure.

FIG. 11 is an example illustration of autonomous vehicles on their routes managing offloading opportunities, in accordance with various aspects of this disclosure. While driving on their routes, the AVs may be continuously sensing the environment of the roads they are travelling on. To optimize communication, the AVs may keep track of FAPs they become aware of. For example, the AVs may keep track of the number of FAPs, the locations of the FAPs, the quality (latency, RSSI, bandwidth, etc.) of the downlinks and uplinks for the FAPs, and coverage of the FAPs. With that information, the AVs may be able to establish a map for their offloading opportunities, and then schedule their trips or select the roads to travel based on the amount of data they can offload when passing nearby the FAPs.

Also, when near each other, AVs may share some or all of the information they are sensing, have received from the Cloud 1100, and/or received from AVs met previously with other AVs. The AVs may be, for example, coming from other directions or other roads. This information can then be used to improve the map of offloading opportunities. Accordingly, an AV may be able to quickly decide what direction or road to take at a particular intersection if their routes are flexible.

The Cloud 1100 may also periodically communicate to each AV about the nearby offloading opportunities based on the feedbacks from other AVs to the Cloud 1100. For example, the Cloud 1100 may advise AV1 that turning right at the next intersection will lead to the FAP 1101 in less than a minute, as well as other FAPs 1103-1113 beyond the first FAP 1101. The Cloud 1100 may also communicate to AV1 that there will not be any FAPs for some distance and/or time if it goes straight ahead. When AV1 nears AV2 after turning right, AV2 may indicate to AV1 the number and locations (as well as travel time) of FAPs along the route it came on, and AV1 may indicate to AV2 of its knowledge of FAPs along its route as well as what the Cloud 1100 had communicated to it.

Accordingly, it can be seen that adequate communication among the self-organized fleets of AVs may lead to optimal and adaptive transport of massive amounts of data.

Figure 12:
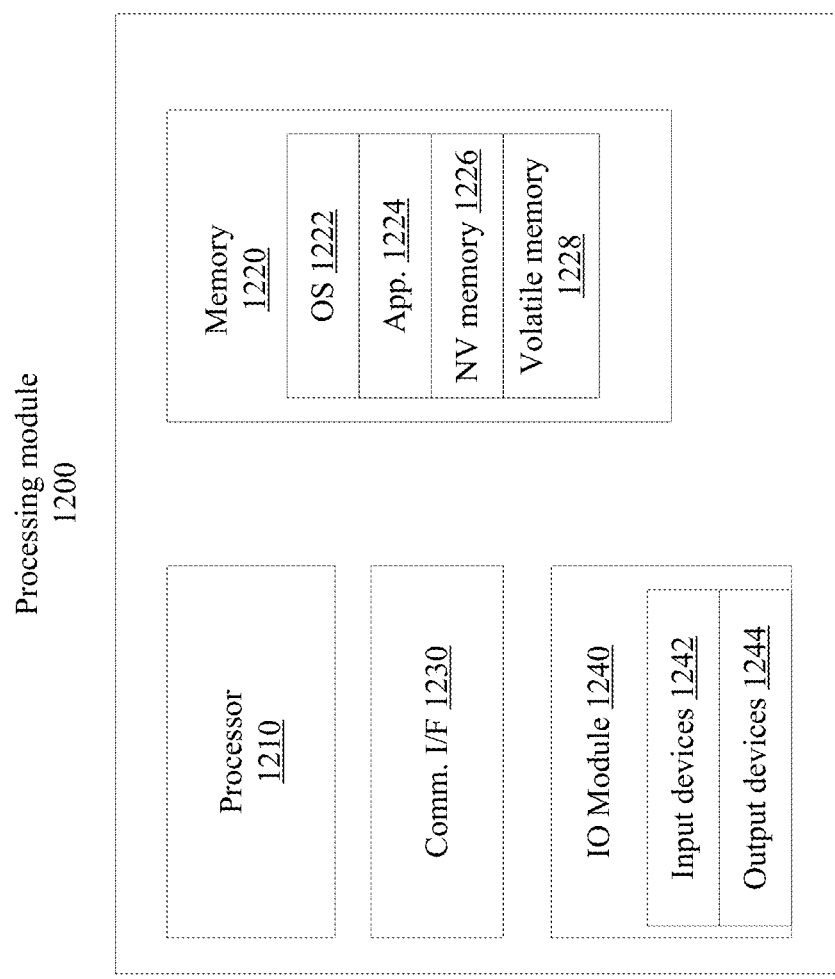
FIG. 12 shows an example block diagram for a processing module in a vehicle, in accordance with various aspects of the present disclosure.

FIG. 12 shows an example block diagram for a processing module in a vehicle, in accordance with various aspects of the present disclosure. Referring to FIG. 12, there is shown a processing module 1200 that may be present in a vehicle. All or portions of the processing module 1200 may be an original part of a vehicle such as, for example, the AV 730, or may be installed after the vehicle was manufactured. The processing module 1200 may be used for one or more of the various functionalities described.

The processing module 1200 may comprise, for example, a processor 1210, memory 1220, a communication interface 1230, and an TO interface 1240. The processor 1210 may be a dedicated processor for controlling at least a portion of a vehicle, and the processor 1210 may also operate in concert with one or more other processors that may also control at least a portion of a vehicle and/or assist in the operation of a vehicle. The memory 1220 may include non-volatile memory 1226 and volatile memory 1228. The operating system 1222 and applications 1224 may be stored in, for example, the non-volatile memory 1226, and may be copied to volatile memory 1228 for execution. Various embodiments of the disclosure may use different memory architectures that are design and/or implementation dependent.

The communication interface 1230 may allow the processing module 1200 to communicate with other devices via, for example, a wired protocol such as USB, Ethernet, Firewire, etc., or a wireless protocol such as Bluetooth, Near Field Communication (NFC), Wi-Fi, etc. The communication may be, for example, with various sensors and/or devices that can relay sensor data. The communication may also be with, for example, with one or more system servers or the Cloud.

The processing module 1200 may also comprise the IO module 1240 for communication with a user via the input devices 1242 and output information to be displayed on output devices 1244. The input devices 1242 may comprise, for example, buttons, touch sensitive screen, which may be a part of a display, a microphone, etc. The output devices 1244 may comprise, for example, the display, a speaker, LEDs, etc.

The processor 1210 may operate using different architectures in different embodiments. For example, the processor 1210 may use the memory 1220 to store instructions to execute, or the processor 1210 may have its own memory (not shown) for its instructions. Furthermore, various embodiments may have the processor 1210 work in concert with other processors in the vehicle in which the processing module 1200 is located. Various embodiments may also allow any of the processors to work individually.

Various embodiments may use other architectures where the different functionalities may be grouped differently. For example, the grouping may be in different integrated circuit chips. Or the grouping may combine different devices such as the IO module 1240 and the communication interface 1230 together, etc.

Figure 13:
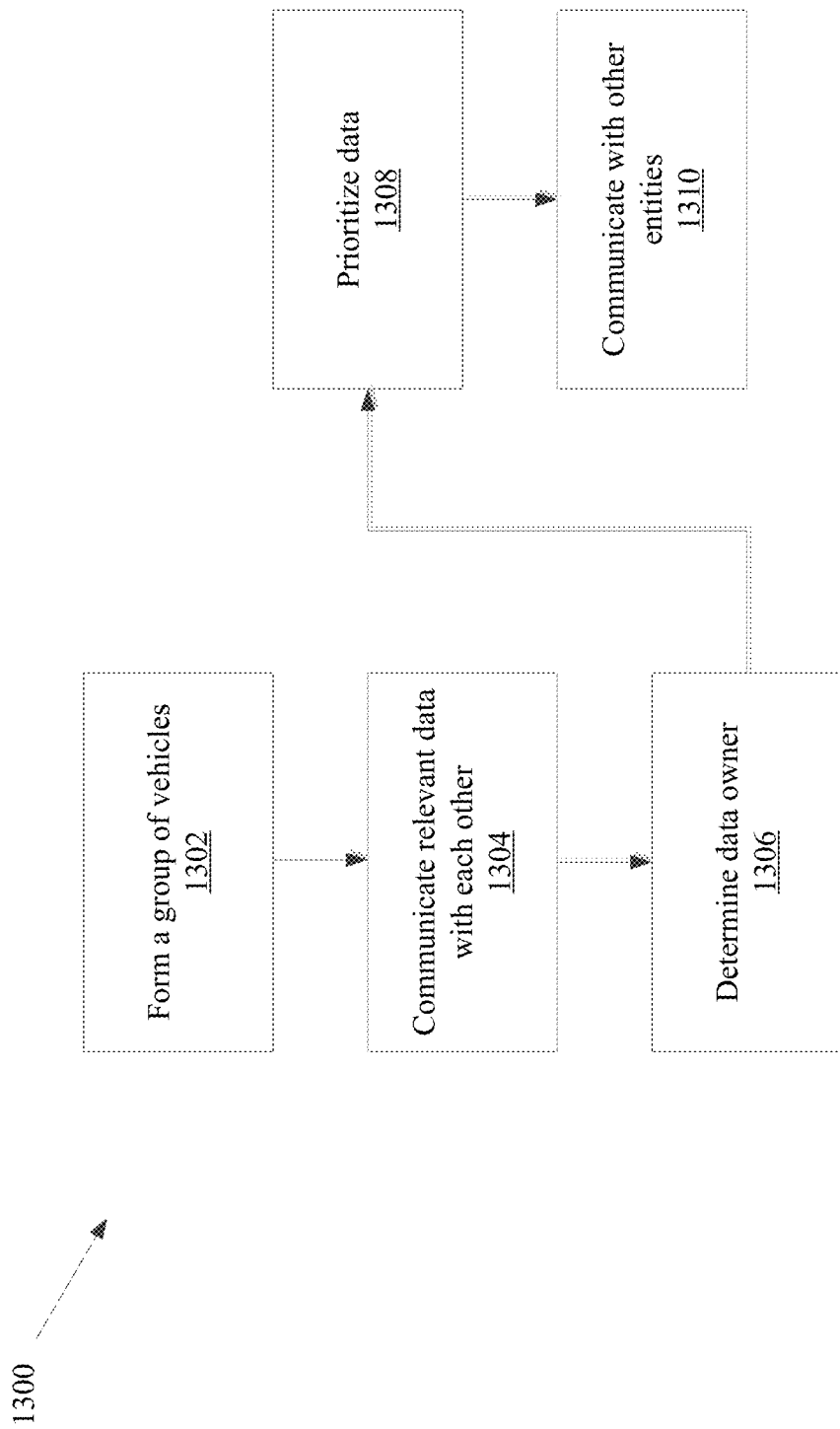
FIG. 13 is a flow diagram of an example method of a plurality of vehicles forming a group for communication with other entities, in accordance with various aspects of the present disclosure.

FIG. 13 is a flow diagram of an example method of a plurality of vehicles forming a group for communication with other entities, in accordance with various aspects of the present disclosure. Referring to FIG. 13, there is shown a flow chart 1300 that includes blocks 1302 to 1310. At block 1302, a group of AVs that are near each other may identify the AVs that are within a local area. For example, FIGS. 9 and 10 may depict several groups of AVs.

The size of the local area and the size of the group may differ depending on, for example, the geography of the area, the number of FAPs in the local area, and/or the quality of signals to the FAPs. For example, if the local area is in a city with tall buildings, the size of the local area may be smaller than if the local area is in an area where there are not many obstructions and/or data traffic. The local area may encompass one FAP or a plurality of FAPs. In some cases, the local area may not have a FAP included. An AV may identify other AVs for its group with help from a Cloud that may indicate likely candidates for the group, or the AV may identify other AVs independently of the Cloud. In an embodiment, the AVs in a group may belong to a same company, or otherwise engaged to coordinate with each other.

In block 1304, the AVs may communicate data with each other to determine a data owner. The communicated data may provide information such as, for example, average speed, direction of travel, proximity to an access point, estimated time of connection to present access point, quality of communication measurements with the present access point, and urgency in communicating the data to the Cloud. The quality of communication measurements may comprise, for example, latency, received signal strength indication (RSSI), bandwidth, etc. The AV that has the most urgency in communicating data to the Cloud may want to connect to the Cloud and control the data transfer directly. Accordingly, the AV with the most urgency may be a good candidate for being the data owner.

In block 1306, the various AVs in the group may determine the data owner. The determination by each AV may use, for example, a common algorithm that weighs the different factors. Where there is an AV with clearly the highest valuation, all AVs may recognize that AV as the data owner. When multiple AVs are tied in their valuation, a tie-breaker may be, for example, a specific data point such as, for example, the amount of time that an AV will be in range of its present FAP. Other methods of tie-breaking may use another data point, or the weighted data points may be looked at in order. The specific format for determining the data owner may use any of a number of different algorithms that may be design and/or implementation dependent. In some cases, the Cloud may select the data owner.

In block 1308, the AVs in a group may use a pre-determined priority format, or the AVs may determine new priorities for data. This may depend, for example, on the types of data that the AVs are presently trying to upload and/or download, the operating status of each AV, etc., as described in FIGS. 7 and 8. The data priority may also be pre-determined by, for example, the Cloud.

Prioritizing data may also lead to, for example, determining policies regarding actions to take with respect to data. For example, the policies may dictate when and how a specific type of data should be sent to the Cloud, kept locally, shared with other entities, or dropped. These actions may require one or more thresholds for time duration for each action. The policies and/or thresholds may be pre-determined by, for example, the Cloud. The priorities and policies/thresholds may start with pre-determined values, and then updated as more data are communicated. The updating may be done, for example, by the data owner which informs the other AVs in its group of the update. Updating the priorities and/or policies/thresholds may use any other method suitable.

In block 1310, each AV may communicate to the data owner the data it wants to communicate to other entities outside the group of vehicles such as, for example, the Cloud, as well as communicating the data it wants to receive from other entities. The data owner may also receive data from other entities such as, for example, the camera 1002 to forward on to the Cloud. Other AVs within range of the camera may ignore the data streamed from the camera 1002 since those AVs are not the data owner.

Figure 14:
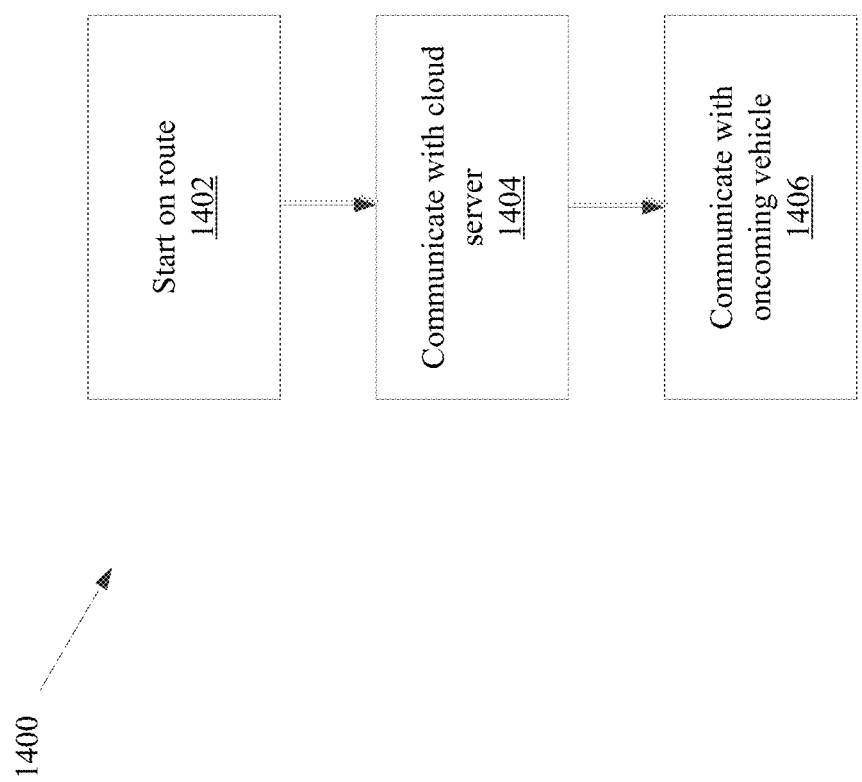
FIG. 14 is a flow diagram of an example method of a vehicle updating its access point map, in accordance with various aspects of the present disclosure.

FIG. 14 is a flow diagram of an example method of a vehicle updating its access point map, in accordance with various aspects of the present disclosure. Referring to FIG. 14, there is shown the flow diagram 1400 comprising blocks 1402 to 1406. At block 1402, an AV may start on its route. The AV may have an initial access point map in its expected route, or if there is no fixed route, then in the general area that the AV may be expected to drive. This access point map may be used for communicating data to the Cloud. The data may comprise information about the route it travels such as, for example, traffic data, infrastructure status, operational information about the AV, data from other entities, etc.

At block 1404, the AV may communicate with the Cloud to receive updates on its access point map, to update the Cloud with information regarding the access points it passed, data to upload for itself as well as from other members of the group it may have joined and/or other entities that are not part of the group, etc. Depending on the access point map, the AV may alter its route to optimize access to the FAPs.

At block 1406, the AV may communicate with another AV it nears to provide information about FAPs that it passed along its route, as well as to receive information regarding FAPs that the other AV passed on its route. The FAP information may be limited to just that portion of the route that each vehicle will be going on, up to all the FAP information that each AV has.

Accordingly, it can be seen that various aspects of the disclosure provides for a method for data communication by a group of vehicles. The method may comprise determining by the group of vehicles one of vehicles in the group of vehicles as a data owner, and prioritizing data based on one or more of operation mode of a vehicle in the group of vehicles, type of data, and size of data. The data owner may then communicate to the Cloud at least a portion of the data from another vehicle of the group of vehicles.

Each vehicle in the group of vehicles may communicate to other vehicles in the group of vehicles relevant data in determining the data owner. The relevant data may comprise, for example, one or more of average speed, direction of travel, proximity to an access point, estimated time of connection to present access point, quality of communication measurements with the present access point, and urgency in communicating the data to the Cloud. The data owner may also be determined to be each vehicle of the group of vehicles in turn, where the data owner may remain a data owner for a specific period of time.

When a vehicle is not directly connected to the Cloud, that vehicle may communicate with the Cloud via at least one other vehicle in the group of vehicles. The data owner may receive first data from an entity that is not part of the group of vehicles to communicate the first data to the Cloud. The non-data owner vehicles in the group of vehicles may not receive the first data from the entity that is not part of the group of vehicles, or may choose to ignore the received first data.

The group of vehicles may also determine one or both of policies and thresholds to determine one or more of when and how each type of data should be sent to the Cloud, kept locally, shared, or dropped.

At least one vehicle in the group of vehicles may communicate information regarding access points to another vehicle that is not part of the group of vehicles.

Various aspects of the disclosure may also provide for a group of vehicles where each vehicle has a processing module that is configured to determine, with a respective processing module for the each vehicle in the group of vehicles, a first vehicle as a data owner from among the group of vehicles. The data owner may be determined to be each vehicle of the group of vehicles in turn for a period of time.

The processing module may determine, with a respective processing module for the each vehicle in the group of vehicles, priority of data based on one or more of operation mode of a vehicle, type of data, and size of data. The data owner may communicate a portion of the data to the Cloud.

Each vehicle of the group of vehicles may communicate via its respective processing module to other vehicles in the group of vehicles the relevant data for determining the data owner. The relevant data may comprise, for example, one or more of average speed, direction of travel, proximity to an access point, estimated time of connection to present access point, quality of communication measurements with the present access point, and urgency in communicating the data to the Cloud.

When a vehicle in the group of vehicles is not directly connected to the Cloud, the vehicle may communicate with the Cloud via at least one other vehicle in the group of vehicles.

The data owner may receive first data from an entity that is not part of the group of vehicles to communicate the first data to the Cloud. The non-data owner vehicles in the group of vehicles may not receive the first data from the entity that is not part of the group of vehicles, or may ignore the received first data. The processing module may also receive second data from the Cloud, and transmit the second data to at least one other vehicle in the group of vehicles.

At least one vehicle in the group of vehicles may communicate information regarding access points to another vehicle that is not part of the group of vehicles.

The various aspects of the disclosure may also provide for a method for data communication by a first vehicle, comprising updating an access point map by sensing access points during a travel of the first vehicle, receiving, by the first vehicle, from the Cloud information for updating the access point map for various routes that the first vehicle can take, and transmitting, by the first vehicle, to the Cloud sensed access point information.

The method may also comprise communicating by the first vehicle to a second vehicle, when the first vehicle nears the second vehicle, at least a portion of the access point map for a direction of travel of the second vehicle. The method may also comprise receiving by the first vehicle, when the first vehicle nears the second vehicle, at least a portion of the access point map for a direction of travel of the first vehicle from the second vehicle.

The first vehicle may use the access point map to select a next portion of the first vehicle's route, as well as to optimize communication of data to the Cloud.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What are claimed:

1. A method for data communication by a group of vehicles, comprising:

determining by the group of vehicles which vehicle in the group of vehicles is a data owner;
prioritizing data based on one or more of:
operation mode of a vehicle in the group of vehicles; type of data; and
size of data;
communicating by the data owner to a cloud server at least a portion of the data from another vehicle of the group of vehicles; and
the data owner receiving first data from an entity that is not part of the group of vehicles to communicate the first data to the cloud server, wherein non-data owner vehicles in the group of vehicles do not receive the first data from the entity that is not part of the group of vehicles.

2. The method according to claim 1, comprising communicating, by each vehicle in the group of vehicles to other vehicles in the group of vehicles, relevant data in determining the data owner.

3. The method according to claim 2, wherein the relevant data comprises one or more of: average speed, direction of travel, proximity to an access point, estimated time of connection to present access point, quality of communication with the present access point, and urgency in communicating the data to the cloud server.

4. The method according to claim 1, comprising, when the vehicle is not directly connected to the cloud server, communicating by the vehicle with the cloud server via at least one other vehicle in the group of vehicles.

5. The method according to claim 1, comprising determining by the group of vehicles one or both of policies and thresholds to determine one or more of: when and how each type of data should be sent to the cloud server, kept locally, shared, or dropped.

6. The method according to claim 1, wherein the data owner is determined to be each vehicle of the group of vehicles in turn for a period of time.

7. The method according to claim 1, wherein at least one vehicle in the group of vehicles communicates information regarding access points to another vehicle that is not part of the group of vehicles.

8. A group of vehicles, comprising:
a processing module, for each vehicle in the group of vehicles, configured to:
determine, with a respective processing module for the each vehicle in the group of vehicles, that a first vehicle of the group of vehicles is a data owner;
determine, with a respective processing module for the each vehicle in the group of vehicles, priority of data based on one or more of:
operation mode of a vehicle;
type of data; and
size of data; and
communicate via the data owner a portion of the data to a cloud server,
wherein at least one vehicle in the group of vehicles communicates information regarding access points to another vehicle that is not part of the group of vehicles.

9. The group of vehicles according to claim 8, wherein each vehicle of the group of vehicles communicates via the respective processing module to other vehicles in the group of vehicles relevant data in determining the data owner.

10. The group of vehicles according to claim 9, wherein the relevant data comprises one or more of: average speed, direction of travel, proximity to an access point, estimated time of connection to present access point, quality of communication with the present access point, and urgency in communicating the data to the cloud server.

11. The group of vehicles according to claim 8, wherein, when a vehicle in the group of vehicles is not directly connected to the cloud server, the vehicle communicates with the cloud server via at least one other vehicle in the group of vehicles.

12. The group of vehicles according to claim 8, wherein:
the data owner receives first data from an entity that is not part of the group of vehicles to communicate the first data to the cloud server; and
non-data owner vehicles in the group of vehicles do not receive the first data from the entity that is not part of the group of vehicles.

13. The group of vehicles according to claim 8, wherein the data owner is determined to be each vehicle of the group of vehicles in turn for a period of time.

14. The group of vehicles according to claim 8, wherein the processing module of the data owner is configured to:
receive second data from the cloud server, and
transmit the second data to at least one other vehicle in the group of vehicles.

15. A method for data communication by a first vehicle, comprising:
updating an access point map by sensing access points during a travel of the first vehicle;
receiving, by the first vehicle, from a cloud server information for updating the access point map for various routes that the first vehicle can take;
transmitting, by the first vehicle, to the cloud server sensed access point information;
communicating by the first vehicle to a second vehicle when the first vehicle nears the second vehicle, at least a portion of the access point map for a direction of travel of the second vehicle; and
receiving by the first vehicle, when the first vehicle nears the second vehicle, at least a portion of the access point map for a direction of travel of the first vehicle from the second vehicle.

16. The method according to claim 15, comprising the first vehicle using the access point map to select a next portion of the first vehicle's route.

17. The method according to claim 15, wherein the first vehicle uses the access point map to optimize communication of data to the cloud server.

18. A method for data communication by a group of vehicles, comprising:
determining by the group of vehicles which vehicle in the group of vehicles is a data owner;
prioritizing data based on one or more of:
operation mode of a vehicle in the group of vehicles;
type of data; and
size of data;
communicating by the data owner to a cloud server at least a portion of the data from another vehicle of the group of vehicles; and
determining by the group of vehicles one or both of policies and thresholds to determine one or more of: when and how each type of data should be sent to the cloud server, kept locally, shared, or dropped.

19. A method for data communication by a group of vehicles, comprising:
determining by the group of vehicles which vehicle in the group of vehicles is a data owner;
prioritizing data based on one or more of:
operation mode of a vehicle in the group of vehicles;
type of data; and size of data; and communicating by the data owner to a cloud server at least a portion of the data from another vehicle of the group of vehicles, wherein at least one vehicle in the group of vehicles communicates information regarding access points to another vehicle that is not part of the group of vehicles.

20. A group of vehicles, comprising:

a processing module, for each vehicle in the group of vehicles, configured to:
- determine, with a respective processing module for the each vehicle in the group of vehicles, that a first vehicle of the group of vehicles is a data owner;
- determine, with a respective processing module for the each vehicle in the group of vehicles, priority of data based on one or more of:
  - operation mode of a vehicle;
  - type of data; and
  - size of data; and
- communicate via the data owner a portion of the data to a cloud server, wherein:
- the data owner receives first data from an entity that is not part of the group of vehicles to communicate the first data to the cloud server; and
- non-data owner vehicles in the group of vehicles do not receive the first data from the entity that is not part of the group of vehicles.

* * * * *